(12) United States Patent
Kaniwa et al.

(10) Patent No.: US 8,847,971 B2
(45) Date of Patent: Sep. 30, 2014

(54) GRAPHIC PROCESSING DEVICE, GRAPHIC PROCESSING METHOD, AND NON-TRANSITORY MEDIUM FOR STORING GRAPHIC PROCESSING PROGRAM FOR GENERATING CORRECTED GRAPHIC DATA

(75) Inventors: Tomo Kaniwa, Kawasaki (JP); Takahiko Orita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 13/355,828

(22) Filed: Jan. 23, 2012

(65) Prior Publication Data

US 2012/0206460 A1 Aug. 16, 2012

(30) Foreign Application Priority Data

Feb. 14, 2011 (JP) .................................. 2011-029180

(51) Int. Cl.
*G06T 11/20* (2006.01)
*G09G 5/37* (2006.01)
*G06F 17/50* (2006.01)

(52) U.S. Cl.
CPC ..................... *G06T 11/203* (2013.01)
USPC ............ 345/562; 345/442; 716/110; 716/118

(58) Field of Classification Search
USPC ................................................ 345/562, 442
See application file for complete search history.

(56) References Cited

U.S. PATENT DOCUMENTS

| 6,466,229 | B1 * | 10/2002 | Nagao | 345/621 |
|---|---|---|---|---|
| 6,577,991 | B1 * | 6/2003 | Yoshizawa | 703/6 |
| 8,516,402 | B1 * | 8/2013 | Wang | 716/52 |

FOREIGN PATENT DOCUMENTS

| JP | 02-132569 | 5/1990 |
|---|---|---|
| JP | 03-185568 | 8/1991 |
| JP | 5-242197 | 9/1993 |
| JP | 6-28425 | 2/1994 |
| JP | 7-56978 | 3/1995 |
| JP | 08-096025 | 4/1996 |
| JP | 2005-321846 | 11/2005 |

OTHER PUBLICATIONS

Machine translated Japanese patent application publication # JP-06-028425 dated Apr. 2, 1994.*
Machine translated Japanese patent publication abstract # JP-04-283023, filing date Oct. 18, 1992.*

(Continued)

*Primary Examiner* — David Zarka
*Assistant Examiner* — Tapas Mazumder
(74) *Attorney, Agent, or Firm* — Staas & Halsey LLP

(57) ABSTRACT

A device includes a processor which executes a process including generating data of a second graphic identified by shifting each of first sides of a first graphic by a length in a direction toward an inside of the first graphic and by tracing, in a direction, the first sides after the shifting and intersection points between the first sides after the shifting, generating data of a third graphic by shifting each of second sides of the second graphic to both sides of each of the second side by the length and by linking end points of the second sides after the shifting using a circular arc which is centered on an end point of the second side before the shifting and which has a radius of the length, and generating data of a fourth graphic by performing a logical addition operation between the second graphic and the third graphic.

12 Claims, 29 Drawing Sheets

(56) References Cited

OTHER PUBLICATIONS

Akira Tsukizoe, et al., "A Concurrent Pattern Operation Algorithm for VLSI Mask Data," The Transactions of the Institute of Electronics, Information and Communication Engineers '86/6 vol. J69-D, No. 6, Jun. 20, 1986, pp. 975-983.

Japanese Office Action dated Jun. 24, 2014 in corresponding Japanese Patent Application No. 2011-029180.

* cited by examiner

- - - →: GRAPHIC A
——→: SIDE SHIFTED PARALLEL
——→: CIRCULAR ARC JOINING END POINT

- - - →: GRAPHIC B
——→: GRAPHIC C

LINE SEGMENT                OBLONG GRAPHIC OF LINE SEGMENT

CIRCULAR ARC                OBLONG GRAPHIC OF CIRCULAR ARC

----→ : GRAPHIC A
----→ : GRAPHIC C
——→ : GRAPHIC D

----→ : GRAPHIC A
——→ : GRAPHIC E

- - - - - : SIDE BEFORE SHIFTING
———— : SIDE AFTER SHIFTING
·········· : FILLED-IN CIRCLE CENTERED ON SIDE AFTER SHIFTING
———— : CIRCULAR ARC GRAPHIC

- - - → : GRAPHIC A
·········→ : PARALLEL-SHIFTED SIDE HAVING INTERSECTION POINT
————→ : FILLED-IN CIRCLE GENERATED CENTERING ON INTERSECTION POINT

- - - - - : SIDE BEFORE SHIFTING
———— : SIDE AFTER SHIFTING
·········· : FILLED-IN CIRCLE CENTERED ON SIDE AFTER SHIFTING
———— : CIRCULAR ARC GRAPHIC

- - -▶ : GRAPHIC A
———▶ : GRAPHIC F

| β1 | β2 | β3 |
|---|---|---|
| 0 | 0 | 0 |

| 1 | 2 | 3 | 4 |
|---|---|---|---|
| SIDE OF β1 | SIDE OF α | SIDE OF β1 | SIDE OF α |

| β1 | β2 | β3 |
|---|---|---|
| 1 | 0 | 0 |

----▶ : GRAPHIC A
········▶ : GRAPHIC LOCATED OUTSIDE OF REGION OF GRAPHIC A, FROM AMONG GRAPHIC F
——▶ : GRAPHIC G

----▶ : GRAPHIC A
——▶ : GRAPHIC G
SHADED PORTION : GRAPHIC E

- - - → : GRAPHIC A
SHADED PORTION : GRAPHIC H

- - - → : GRAPHIC A
SHADED PORTION : GRAPHIC I

GRAPHIC PROCESSING DEVICE, GRAPHIC PROCESSING METHOD, AND NON-TRANSITORY MEDIUM FOR STORING GRAPHIC PROCESSING PROGRAM FOR GENERATING CORRECTED GRAPHIC DATA

CROSS-REFERENCE TO RELATED APPLICATIONS

This application is based upon and claims the benefit of priority of the prior Japanese Patent Application No. 2011-029180, filed on Feb. 14, 2011, the entire contents of which are incorporated herein by reference.

FIELD

The embodiment discussed herein is related to a graphic processing device, a graphic processing method, and a medium for storing a graphic processing program.

BACKGROUND

For example, in order to manufacture a printed board, manufacturing data is output from a physical design Computer Aided Design (CAD) system for the printed board. The manufacturing data includes Gerber data used for creating an artwork film. The Gerber data expresses a graphic to be filled in, such as a plane pattern or the like, using the locus (a line whose width is the diameter of a circle) of a circle having a certain radius. When a portion occurs that is hard to express using the Gerber data, there is a discrepancy between the portion and the data from the physical design CAD system. Therefore, in the physical design CAD system for the printed board, a plane pattern is filled in using a line having a certain width (the diameter of a circle used for expressing the Gerber data), and a portion hard to fill in (namely, a filling-in width violation portion) is detected and displayed to a designer as an error, or is automatically corrected.

As one of related techniques for detecting the filling-in width violation portion, there has been a method in which the shortest distance between the sides of of polygon shapes configuring plane patterns is obtained as illustrated by arrows in FIG. 1 and a filling-in width violation portion is detected by comparing the distance with a filling-in width. In this technique, since the shortest distance between the sides of the plane patterns is obtained, if the number of the corners of the plane patterns of processing targets increases, the number of sides also increases and the number of the combinations of sides increases. Therefore, a processing time is lengthened. Specifically, in an undesirable case, since a time is taken that is proportional to the square of the number of corners, an operation calculating distances between sides turns out to be performed one trillion times in a plane pattern the number of corners of which exceeds one million. In addition, not only the filling-in width violation portion is detected, but also processing for rounding off a corner whose angle is less than or equal to a certain angle is performed at the same time, in order to deal with electro-magnetic compatibility (EMC) or the like. In addition, filling-in violation indicates a filling-in width violation, an acceptable angle violation, or both thereof.

As another related technique, there has been a method in which a filling-in width violation portion is detected by performing an image processing operation. In this technique, data is treated as two-dimensional mesh data. Therefore, when graphic data such as a plane pattern or the like is held as a one-dimensional corner array, since processing for converting data is performed, an extra processing load rests. Examples of documents disclosing the above-mentioned techniques include Japanese Laid-open Patent Publication No. 05-242197, Japanese Laid-open Patent Publication No. 06-28425, Japanese Laid-open Patent Publication No. 2005-321846, Japanese Laid-open Patent Publication No. 07-56978, and Tsukizoe Akira, Kozawa Tokinori, Sakemi Junya, Miura Chihei, and Ishii Tatsuki, "A pattern logical operation method simultaneously processing logical operation and intersection point calculation for VLSI mask data (A concurrent pattern operation algorithm for VLSI mask data)", IEICE Transactions on Electronics, '86/6 Vol. J69-D No. 6.

SUMMARY

According to an aspect of the invention, a graphic processing device includes a memory which stores data of a first graphic and a processor which executes a process including generating data of a second graphic identified by shifting each of a plurality of first sides of the first graphic stored in the memory by a certain length in a direction toward an inside of the first graphic and by tracing, in a certain direction, the first sides after the shifting and intersection points between the first sides after the shifting, generating data of a third graphic by shifting each of a plurality of second sides of the second graphic to both sides of each of the second side by the certain length and by linking end points of the second sides after the shifting using a circular arc which is centered on an end point of the second side before the shifting and which has a radius of the certain length, and generating data of a fourth graphic by performing a logical addition operation relating to a graphic between the second graphic and the third graphic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
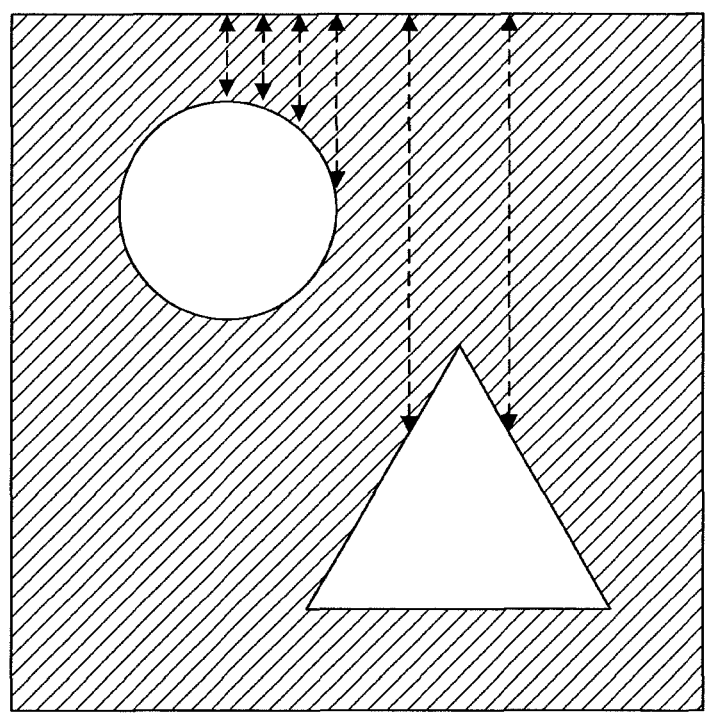
FIG. 1 is a diagram for explaining a related technique.
Figure 2:
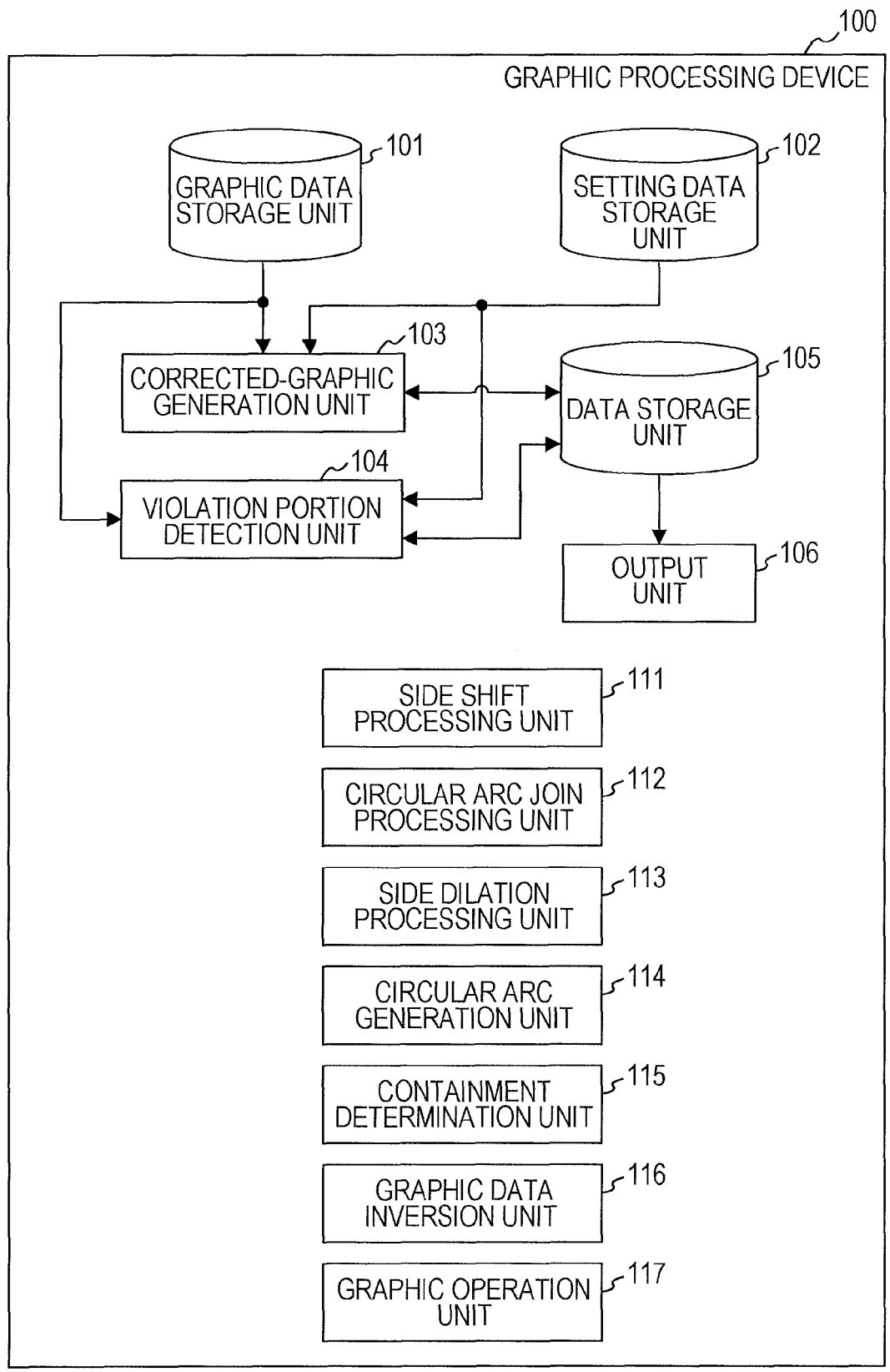
FIG. 2 is a functional block diagram of a graphic processing device according to the present embodiment.

FIG. 2 illustrates the functional block diagram of a graphic processing device 100 according to an embodiment of the present technology. The graphic processing device 100 includes a graphic data storage unit 101, a setting data storage unit 102, a corrected-graphic generation unit 103, a violation portion detection unit 104, a data storage unit 105, and an output unit 106. Furthermore, the graphic processing device 100 includes a side shift processing unit 111, a circular arc join processing unit 112, a side dilation processing unit 113, a circular arc generation unit 114, a containment determination unit 115, a graphic data inversion unit 116, and a graphic operation unit 117, as individual operation units performing processing in collaboration with the corrected-graphic generation unit 103 and the violation portion detection unit 104.

The corrected-graphic generation unit 103 processes the graphic data of a processing target, stored in the graphic data storage unit 101, in accordance with the setting data storage unit 102, and stores data being subjected to processing and the data of a processing result in the data storage unit 105. The violation portion detection unit 104 processes graphic data, stored in the graphic data storage unit 101 and the data storage unit 105, in accordance with the setting data storage unit 102, and stores data being subjected to processing and the data of a processing result in the data storage unit 105. For example, the output unit 106 causes a display device or an output device such as a printing device or the like to display the graphic data stored in the data storage unit 105.

The side shift processing unit 111 performs the parallel shift processing of a side. The circular arc join processing unit 112 generates a circular arc interlinking a side subjected to parallel shifting. The side dilation processing unit 113 generates an oblong graphic dilating a side. The circular arc generation unit 114 generates a circle at the point of intersection between sides after parallel shifting. The containment determination unit 115 performs processing used for determining whether a graphic contains another graphic. The graphic data inversion unit 116 inverts the holding direction of the corners of a graphic. The graphic operation unit 117 performs, on a graphic, an operation such as an OR operation or the like.

Figure 3:
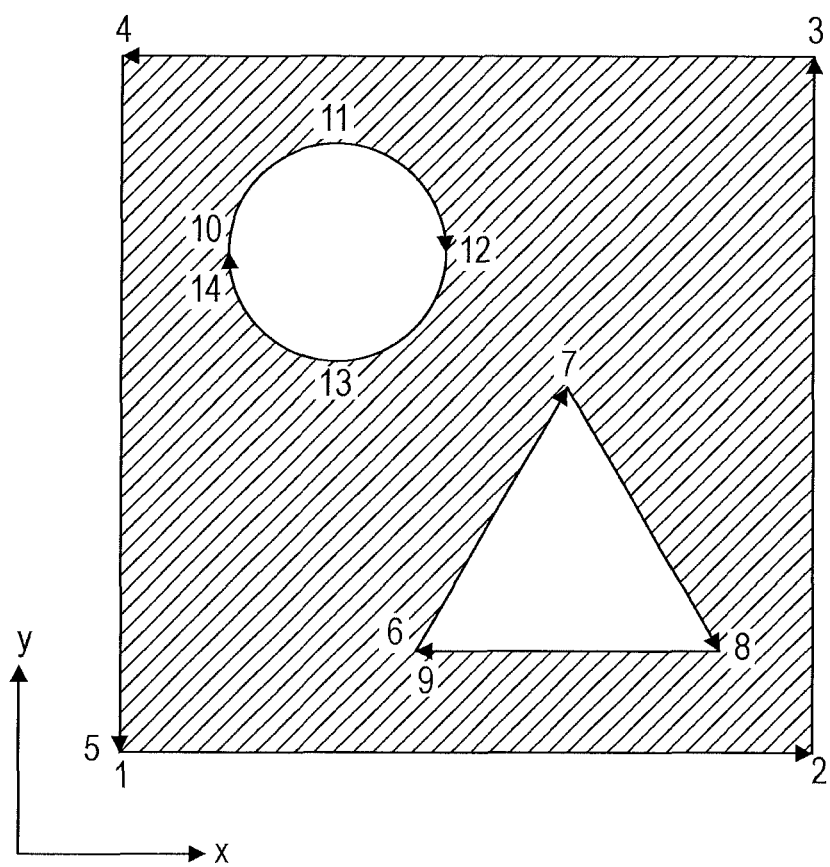
FIG. 3 is a diagram for explaining how to hold graphic data.

In the present embodiment, the graphic data is held in the graphic data storage unit 101 and the data storage unit 105, as the corner array of an order illustrated in FIG. 3. Each corner is defined using coordinate values on a two-dimensional plane formed by an x-axis and a y-axis. In addition, the external form of a graphic is specified by holding the corners counterclockwise. In FIG. 3, a rectangle indicating the external form is specified by corners of corner numbers 1 to 5 in a counterclockwise fashion. In addition, punching is specified by holding the corners clockwise. In FIG. 3, a triangle indicating the punching is specified by corners of corner numbers 6 to 9 in a clockwise fashion. Furthermore, in a circular arc serving as a side, the corners thereof are held in an order of: the starting point of the circular arc, the intermediate point thereof, and the ending point thereof. In addition, the circular arc is caused to separately hold information that the circular arc is a circular arc, and it may be possible to discriminate a line segment from a circular arc. In addition, when the circular arc goes around and forms a circle, the circular arc holds information, as a circular arc divided into semicircles. In FIG. 3, with respect to the upper semicircle of the circle indicating punching, a starting point, an intermediate point, and an ending point are specified clockwise by the corners of corner numbers 10 to 12. With respect to a lower semicircle, a starting point, an intermediate point, and an ending point are specified clockwise by the corners of corner numbers 12 to 14.

In addition, in the setting data storage unit 102, the radius of a filled-in circle and the value of the angle of a corner determined as violation (namely, an acceptable angle) are stored. In addition, since usually it may be assumed that the acceptable angle is less than or equal to "r" degrees, the value of this "r" is stored in the setting data storage unit 102.

Next, using FIG. 4 to FIG. 43, the content of processing performed in the graphic processing device 100 will be described. First, using FIG. 4 to FIG. 18, processing will be described that is performed when the data of a graphic is generated after a filling-in violation portion has been corrected with respect to the graphic of a processing target.

Figure 4:
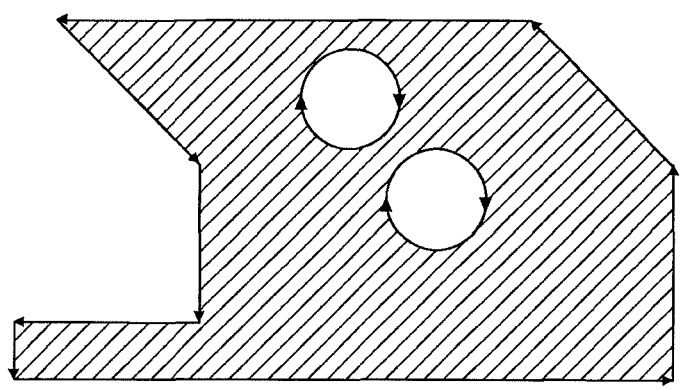
FIG. 4 is a diagram illustrating an example of a graphic of a processing target.

In addition, for the sake of the simplicity of the description thereof, it is assumed that such a plane pattern as illustrated in FIG. 4 is the graphic of a processing target. Namely, it is assumed that the data of such a graphic as illustrated in FIG. 4 is stored in the graphic data storage unit 101.

Figure 5:
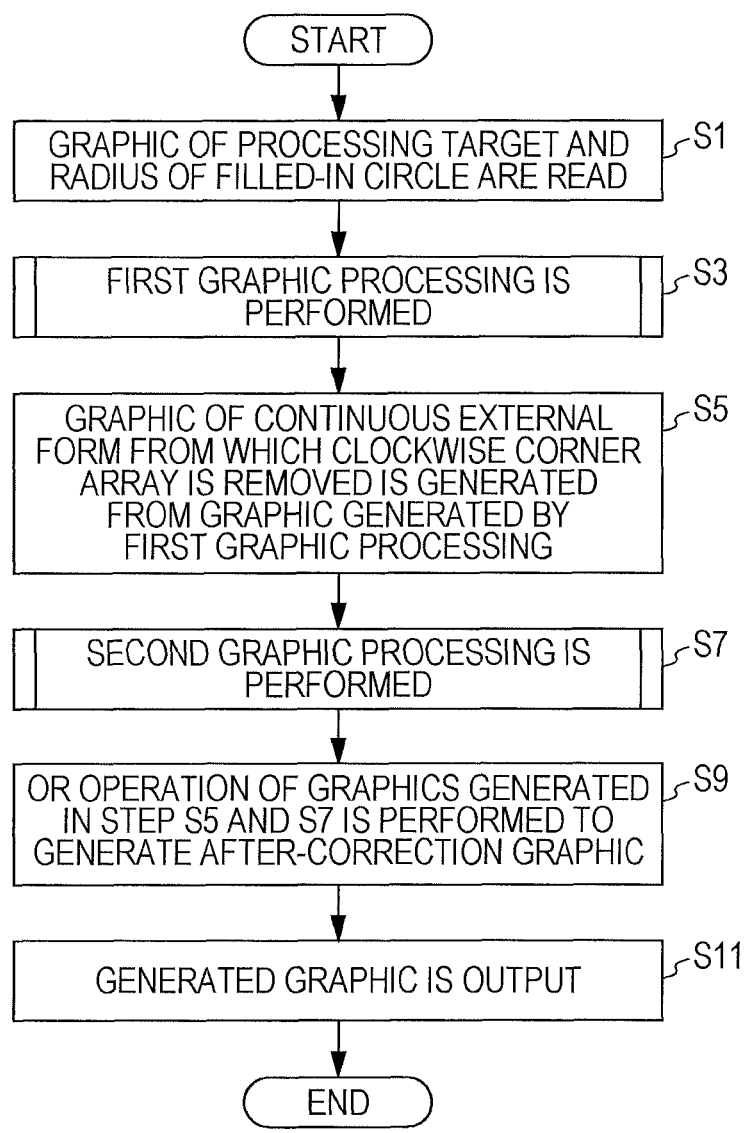
FIG. 5 is a diagram illustrating a processing flow of a corrected-graphic generation processing.

First, the corrected-graphic generation unit 103 reads out the graphic data of the processing target from the graphic data storage unit 101, and reads out the radius of a filled-in circle from the setting data storage unit 102 (FIG. 5: Step S1). Next, the corrected-graphic generation unit 103 performs first graphic processing (Step S3). This first graphic processing is processing in which a side is shifted into the inside of the graphic of a processing target and the end points of the side after the shifting are connected using a circular arc. The detail of this processing will be described using FIG. 6 to FIG. 10.

Figure 6:
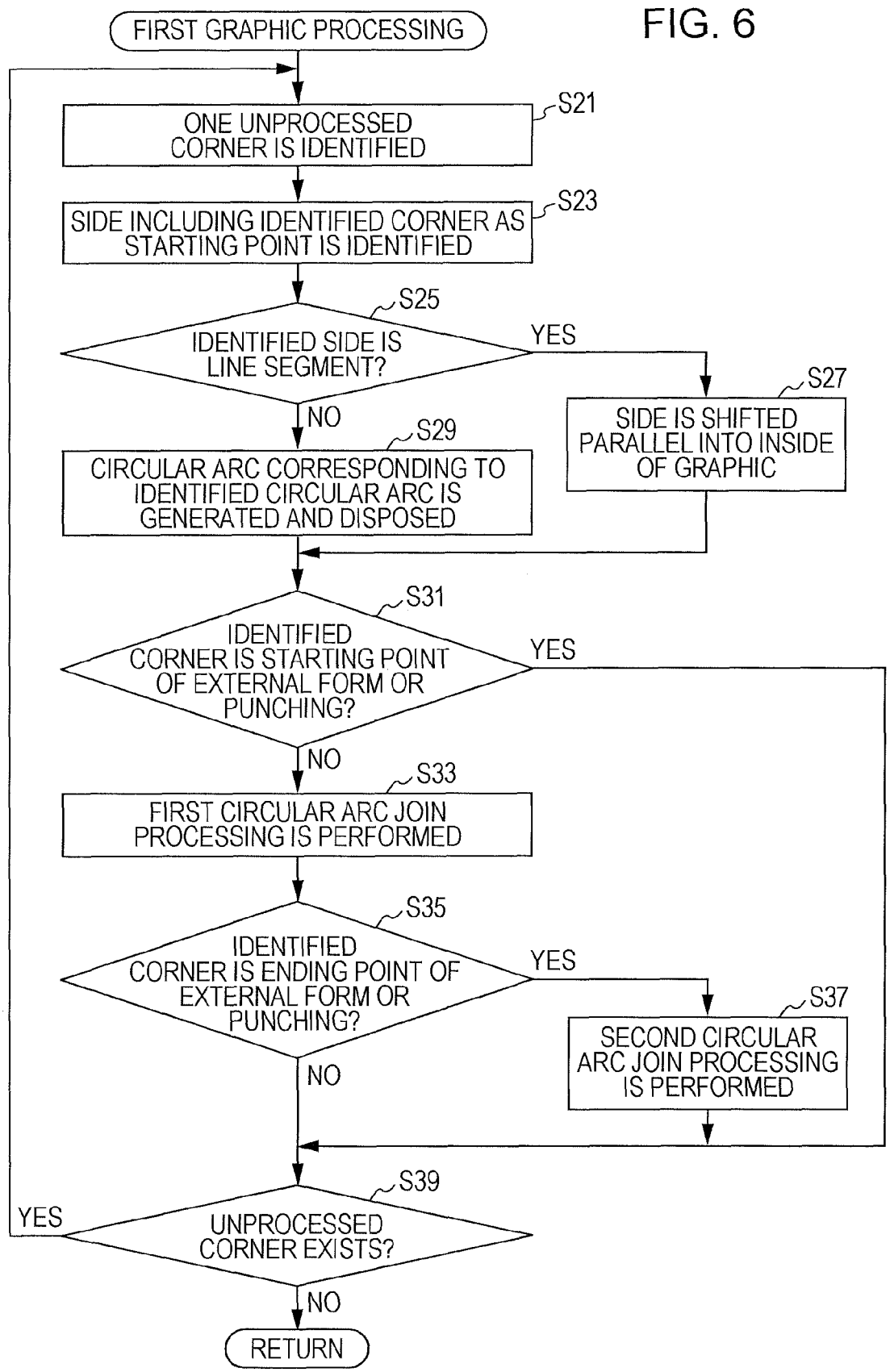
FIG. 6 is a diagram illustrating a processing flow of first graphic processing.

First, the corrected-graphic generation unit 103 identifies one unprocessed corner of the graphic of a processing target (FIG. 6: Step S21). For example, it is assumed that processing is performed in ascending order of corner number. In addition, the corrected-graphic generation unit 103 identifies a side including the identified corner as a starting point (Step S23). In addition, the corrected-graphic generation unit 103 instructs the side shift processing unit 111 to perform processing on the identified side.

The side shift processing unit 111 determines whether the identified side is a line segment (Step S25). When the identified side is a line segment, the side shift processing unit 111 performs processing for causing the side to be shifted parallel into the inside of the graphic by the radius of the filled-in circle (Step S27). A processing result is stored in the data storage unit 105. After that, the processing makes a transition to Step S31.

Figure 7A:
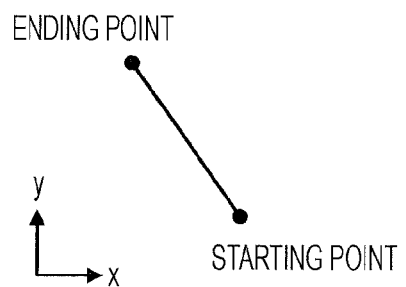
FIG. 7A is a diagram for explaining parallel shift processing of a side of a line segment.
Figure 7B:
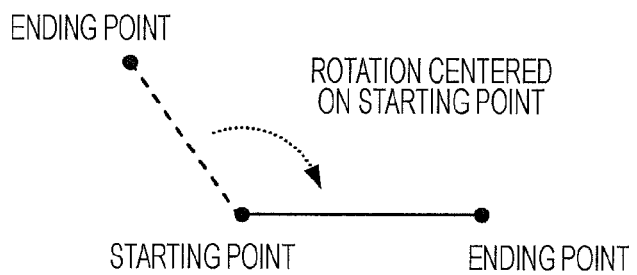
FIG. 7B is a diagram for explaining parallel shift processing of a side of a line segment.
Figure 7C:
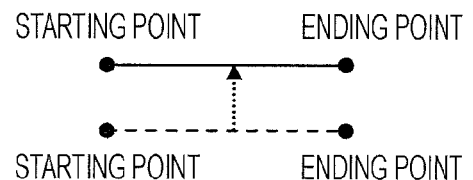
FIG. 7C is a diagram for explaining parallel shift processing of a side of a line segment.
Figure 7D:
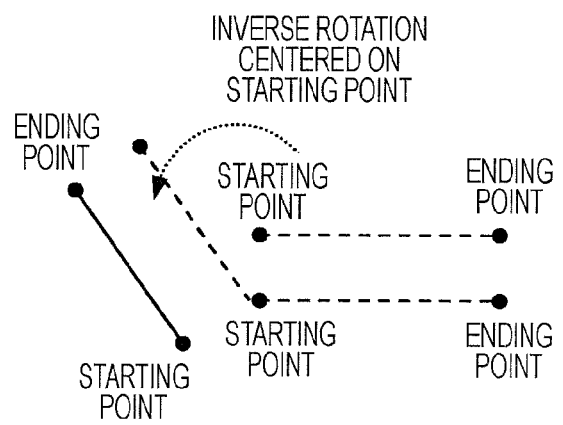
FIG. 7D is a diagram for explaining parallel shift processing of a side of a line segment.

The processing of the present step will be specifically described using FIG. 7A to FIG. 7D. First, such a side as illustrated in FIG. 7A is rotated with the starting point of the side as a center as illustrated in FIG. 7B so that an angle between an x-axis and the side becomes "0". In addition, as illustrated in FIG. 7C, the side after the rotational shifting is shifted parallel in the positive direction of a y-axis by the radius (the length of an arrowed dotted straight line) of the filled-in circle. Finally, as illustrated in FIG. 7D, with the starting point of the side before the parallel shifting as a center, the side after the parallel shifting is rotated by the same angle in a direction opposite to FIG. 7B. In this way, it may be possible to obtain the side shifted parallel into the inside of the graphic by an amount of the radius of the filled-in circle. After that, the processing makes a transition to Step S31.

On the other hand, when the side is a circular arc, the side shift processing unit 111 generates and disposes a circular arc corresponding to the identified circular arc, thereby performing the parallel shift processing of the circular arc (Step S29). A processing result is stored in the data storage unit 105. After that, the processing makes a transition to Step S31.

Figure 8A:
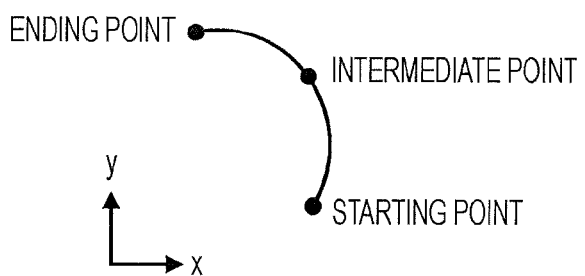
FIG. 8A is a diagram for explaining parallel shift processing of a side of a circular arc.
Figure 8B:
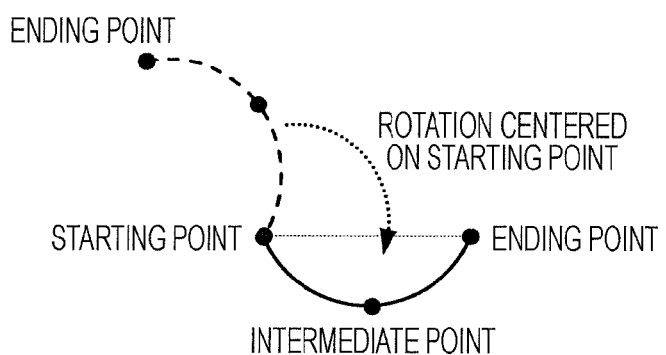
FIG. 8B is a diagram for explaining parallel shift processing of a side of a circular arc.
Figure 8C:
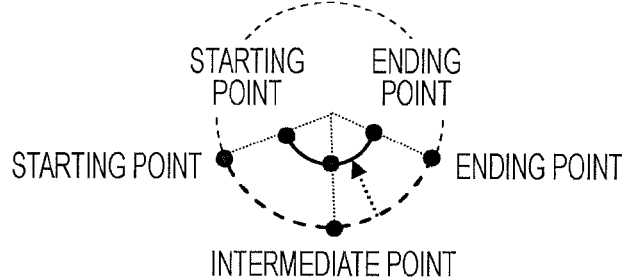
FIG. 8C is a diagram for explaining parallel shift processing of a side of a circular arc.
Figure 8D:
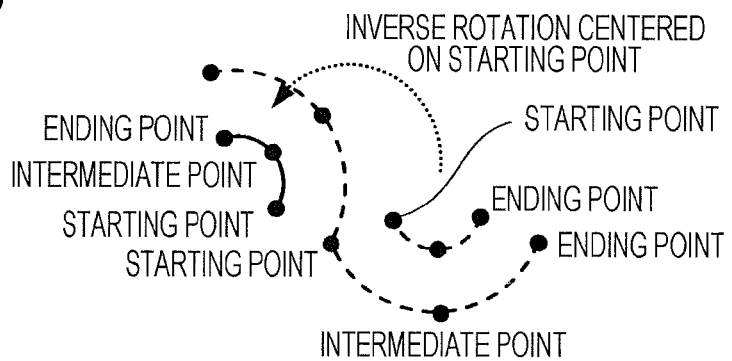
FIG. 8D is a diagram for explaining parallel shift processing of a side of a circular arc.

The processing of the present step will be specifically described using FIG. 8A to FIG. 8D and FIG. 9A to FIG. 9C. First, such a circular arc as illustrated in FIG. 8A is rotated with the starting point of the circular arc as a center as illustrated in FIG. 8B so that an angle between the x-axis and a line connecting the starting point and the ending point of the circular arc becomes "0". In addition, in a state in FIG. 8B, it is determined whether the intermediate point of the circular arc is located above the line connecting the starting point and the ending point of the circular arc (namely, in the positive direction of the y-axis) or located below the line connecting the starting point and the ending point of the circular arc (namely, in the negative direction of the y-axis). In the case of FIG. 8B, the intermediate point of the circular arc is located below the line connecting the starting point and the ending point of the circular arc. When the intermediate point of the circular arc is located below the line connecting the starting point and the ending point of the circular arc, a circular arc is generated whose radius is obtained by shortening the radius of the circular arc by an amount of the radius (the length of an arrowed dotted straight line) of the filled-in circle, as illustrated in FIG. 8C. On the contrary, when the intermediate point of the circular arc is located above the line connecting the starting point and the ending point of the circular arc, a circular arc is generated whose radius is obtained by lengthening the radius of the circular arc by an amount of the radius of the filled-in circle. While the starting point, the intermediate point, and the ending point of the generated circular arc are calculated from the starting point, the intermediate point, and the ending point of the original circular arc, since this method has existed, the description thereof will be omitted. Finally, as illustrated in FIG. 8D, with the starting point of the original circular arc as a center, the generated circular arc is rotated by the same angle in a direction opposite to FIG. 8B.

Figure 9A:
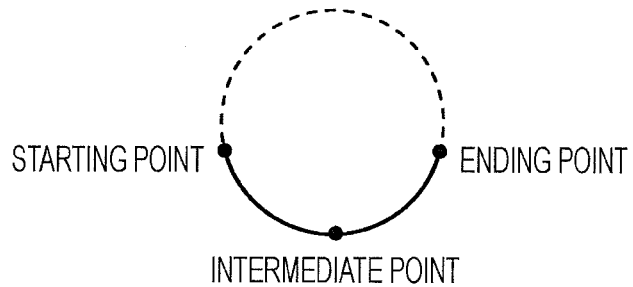
FIG. 9A is a diagram for explaining parallel shift processing of a side of a circular arc.
Figure 9B:
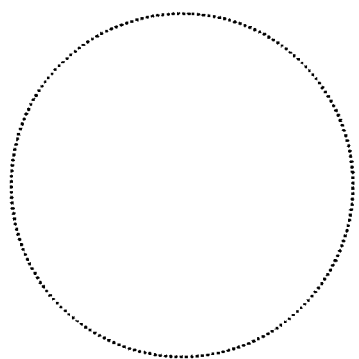
FIG. 9B is a diagram for explaining parallel shift processing of a side of a circular arc.
Figure 9C:
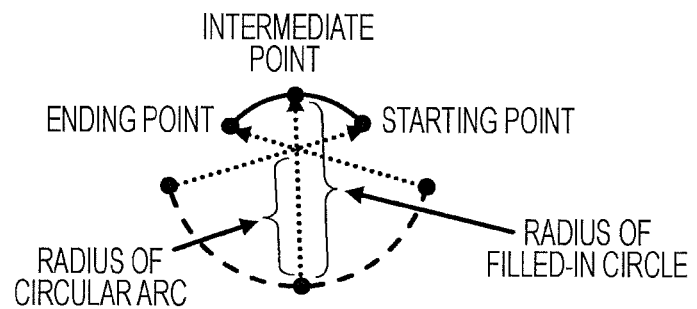
FIG. 9C is a diagram for explaining parallel shift processing of a side of a circular arc.

In addition, sometimes the radius of the circular arc is shorter than the radius of the filled-in circle. FIG. 9A indicates a circular arc, and FIG. 9B indicates a filled-in circle having a radius longer than the radius of the circular arc. In such a case, as illustrated in FIG. 9C, a circular arc is generated that has a radius of a length obtained by subtracting the radius of the circular arc from the radius of the filled-in circle and whose bulging direction is opposite. In this time, the starting point of the generated circular arc is located at a position intersecting from the starting point of the original circular arc through a center point, and the ending point of the generated circular arc is also located at a position intersecting from the ending point of the original circular through the center point.

In addition, the corrected-graphic generation unit 103 confirms whether the identified corner is the starting point of an external form or punching (Step S31). When the identified corner is the starting point of the external form or punching, the processing makes a transition to Step S39. On the other hand, when the identified corner is not the starting point of the external form or the starting point of punching, the corrected-graphic generation unit 103 instructs the circular arc join processing unit 112 to perform processing on the starting point of the side after the parallel shifting.

In response to this, the circular arc join processing unit 112 performs first circular arc join processing (Step S33). Specifically, the starting point of the side after this time's parallel shifting is regarded as an ending point, and the ending point of a side most recently subjected to the parallel shifting is regarded as a starting point, thereby generating a clockwise circular arc whose center is the identified corner. In addition, using the generated circular arc, the starting point of the side after this time's parallel shifting and the ending point of the side most recently subjected to the parallel shifting are joined to each other.

In addition, the corrected-graphic generation unit 103 confirms whether the identified corner is the ending point of the external form or punching (Step S35). When the identified corner is the ending point of the external form or punching, the corrected-graphic generation unit 103 instructs the circular arc join processing unit 112 to perform processing on the ending point of the side after the parallel shifting.

In response to this, the circular arc join processing unit 112 performs second circular arc join processing (Step S37). Specifically, the starting point of the side after the parallel shifting performed with respect to the starting point of the external form or punching is regarded as an ending point, and the ending point of the side subjected to the parallel shifting at this time is regarded as a starting point, thereby generating a clockwise circular arc whose center is the starting point of the external form or punching. In addition, using the generated circular arc, the starting point of the side after the parallel shifting performed with respect to the starting point of the external form or punching and the ending point of the side subjected to the parallel shifting at this time are joined to each other.

When the identified corner is the ending point of the external form or punching or after Step S37, the corrected-graphic generation unit 103 determines whether an unprocessed corner exists (Step S39). When the unprocessed corner exists, the processing returns to Step S21. On the other hand, when no unprocessed corner exists, the processing returns to former processing. The data of the graphic generated in such a way as described above is stored in the data storage unit 105.

Figure 10:
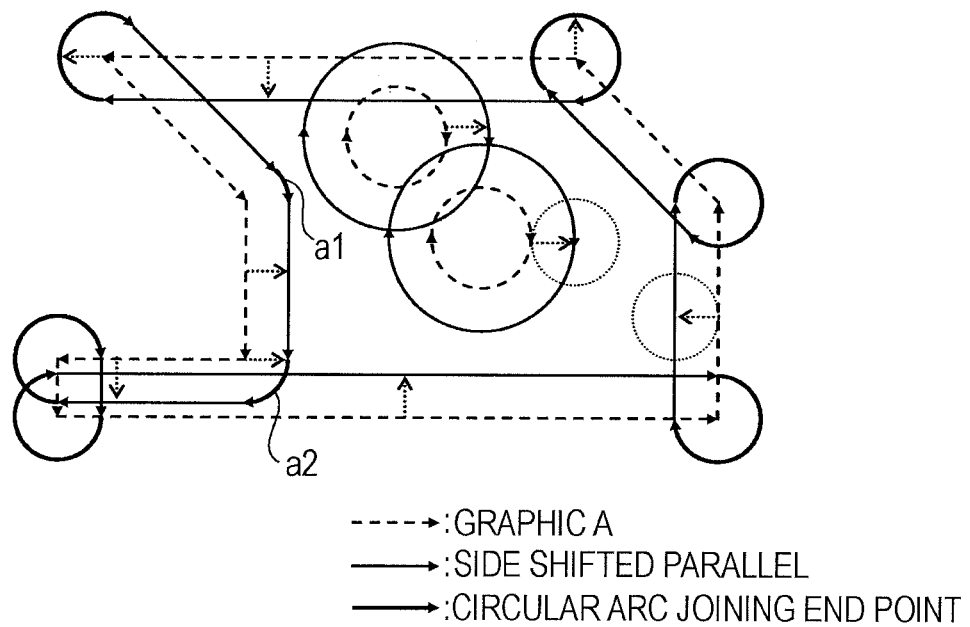
FIG. 10 is a diagram illustrating a graphic after processing at a first stage in after-correction graphic generation is performed on a graphic of a processing target.

By performing such processing as described above, from the graphic (defined as a graphic A) of a processing target illustrated in FIG. 4, such a graphic (defined as a graphic B) as illustrated in FIG. 10 is generated. In the graphic in FIG. 10, an arrowed thin dotted line indicates the radius of the filled-in circle, and it is understood that the side of the graphic A is shifted parallel into the inside by the radius of the filled-in circle. In addition, the end point of the side after the parallel shifting is joined using the clockwise circular arc. When sides after the parallel shifting intersect with each other, circular arcs are generated so as to form projecting shapes. On the other hand, when, as circular arcs a1 and a2, sides after the parallel shifting do not intersect with each other, the sides after the parallel shifting are linked using a circular arc. As for the circular arc of punching, since the circular arc is shifted parallel into the inside of the graphic, a circular arc larger than the circular arc of punching is generated. In this example, circular arcs after the parallel shifting intersect with each other, and as for the circular arc located near the external form, the circular arc after the parallel shifting also intersects with the side after the parallel shifting performed with respect to the external form. By performing such processing as described above, the side of the external form is also unicursal after the parallel shifting.

Returning to the description of the processing in FIG. 5, the corrected-graphic generation unit 103 instructs the graphic operation unit 117 to generate the graphic C of a continuous external form obtained by removing a clockwise corner array other than punching portions, from the graphic B generated by the first graphic processing, and stores the data of the corresponding graphic C in the data storage unit 105 (Step S5).

Figure 11:
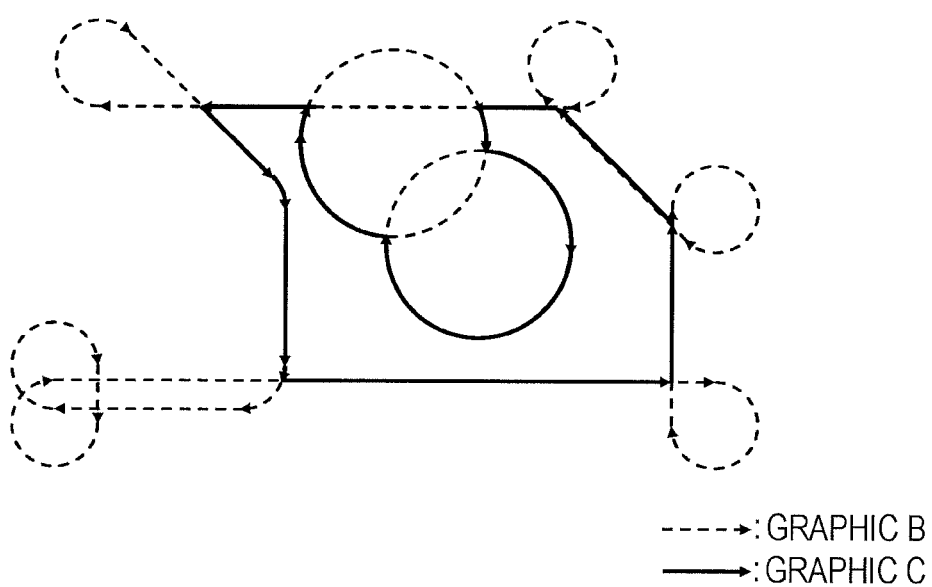
FIG. 11 is a diagram illustrating a graphic after processing at a second stage in the after-correction graphic generation is performed on a graphic of a processing target.
Figure 12:
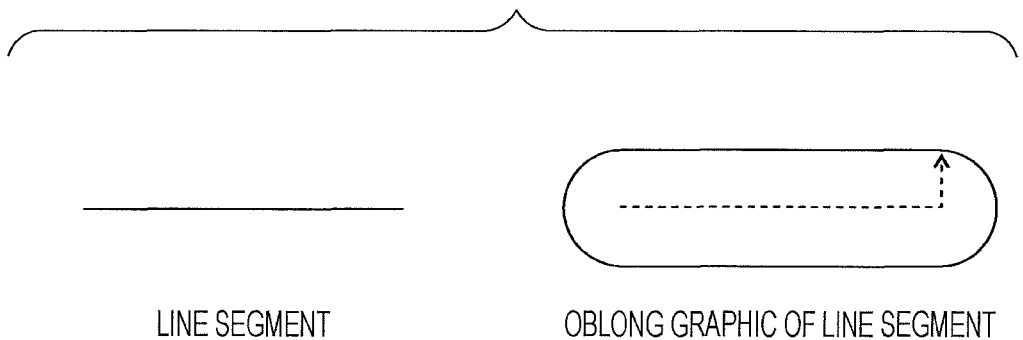
FIG. 12 is a diagram for explaining a summary of second graphic processing.
Figure 13:
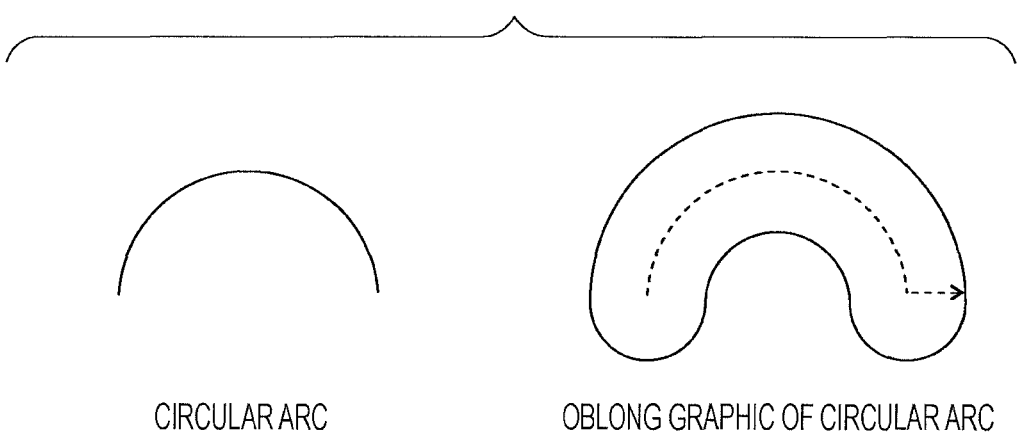
FIG. 13 is a diagram for explaining a summary of the second graphic processing.

In the graphic B, by tracing counterclockwise the sides after parallel shifting and the points of intersection between the sides after the corresponding parallel shifting, the external form is identified, and a closed region where corners are disposed clockwise is deleted. In addition, when a side after parallel shifting, which does not intersect with a side after parallel shifting relating to the external form, remains within the graphic, even if the side corresponds to a clockwise corner arrangement, the corresponding side after the parallel shifting is left. From such a graphic B as illustrated in FIG. 10, such a graphic C as illustrated in FIG. 11 is generated. As understood from FIG. 11, since a closed region where corners are disposed clockwise is to be removed, the closed region is indicated by a dotted line. In addition, the external form, identified by tracing counterclockwise the sides after parallel shifting and the points of intersection between the sides after the corresponding parallel shifting, is indicated by a solid line. In addition, in the present example, when being shifted parallel, the sides of punching intersect with each other, and hence the punching disappears.

Since such processing as described above may be performed using a method disclosed in, for example, Japanese Laid-open Patent Publication No. 2-132569, the detailed description thereof will be omitted. When such a method is adopted, a time proportional to the logarithm of the number of corners×the number of corners may be taken to perform processing. Namely, a processing speed is speeded up.

Next, the corrected-graphic generation unit 103 reads out the data of a graphic, stored in the data storage unit 105, and performs second graphic processing (Step S7). This second graphic processing is processing in which the side of the graphic C generated in Step S5 is dilated. Specifically, in the case of such a line segment as illustrated on the left side of FIG. 12, after the line segment is shifted parallel up and down by an amount of the radius of the filled-in circle, the shifted line segments are linked using circular arcs whose centers are both end portions of the line segment and have radii of the same length as the radius of the filled-in circle, thereby generating such an oblong graphic as illustrated on the right side of FIG. 12. In addition, in the case of such a circular arc as illustrated on the left side of FIG. 13, a circular arc having a radius longer by an amount of the radius of the filled-in circle is generated on the outside of the circular arc, and a circular arc having a radius shorter by an amount of the radius of the filled-in circle is generated on the inside of the circular arc. In addition, the circular arcs are linked using circular arcs whose centers are both end portions of the circular arc and have radii of the same length as the radius of the filled-in circle, thereby generating such an oblong graphic as illustrated on the right side of FIG. 13. The detail of this processing will be described using FIG. 14 to FIG. 17.

Figure 14:
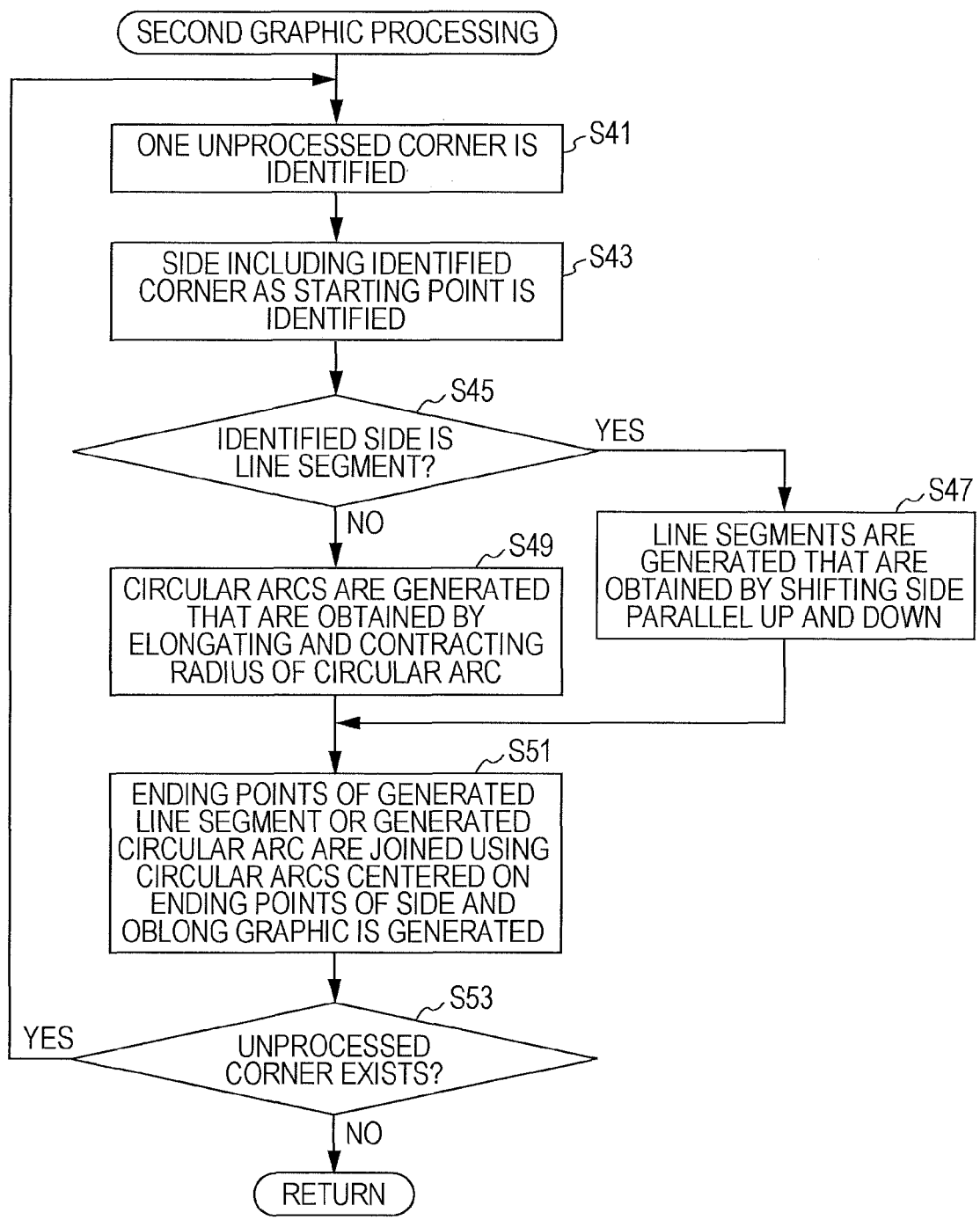
FIG. 14 is a diagram illustrating a processing flow of the second graphic processing.

First, the corrected-graphic generation unit 103 identifies one unprocessed corner of the graphic of a processing target (FIG. 14: Step S41). For example, it is assumed that processing is performed in ascending order of corner number. In addition, the corrected-graphic generation unit 103 identifies a side including the identified corner as a starting point (Step S43). In addition, the corrected-graphic generation unit 103 instructs the side dilation processing unit 113 to perform processing on the identified side.

In response to this, the side dilation processing unit 113 determines whether the identified side is a line segment (Step S45). When the identified side is a line segment, the side dilation processing unit 113 performs processing for generating sides obtained by shifting the side parallel up and down by an amount of the radius of the filled-in circle (Step S47). After that, the processing makes a transition to Step S51.

Figure 15A:
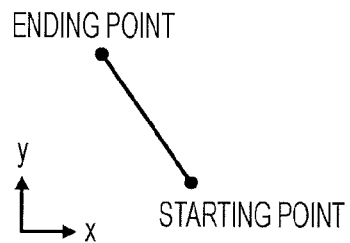
FIG. 15A is a diagram for explaining dilation processing of a side of a line segment.
Figure 15B:
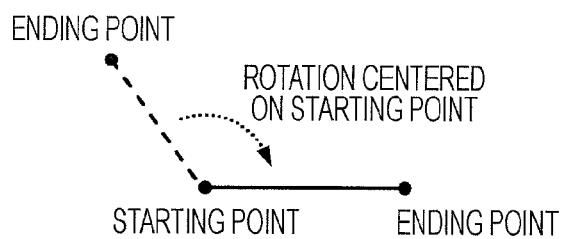
FIG. 15B is a diagram for explaining dilation processing of a side of a line segment.
Figure 15C:
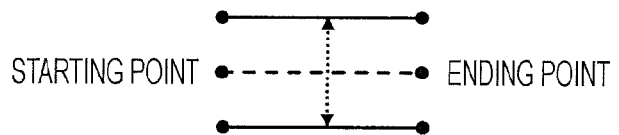
FIG. 15C is a diagram for explaining dilation processing of a side of a line segment.
Figure 15D:
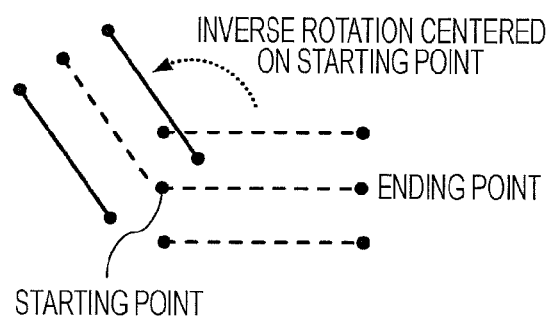
FIG. 15D is a diagram for explaining dilation processing of a side of a line segment.
Figure 15E:
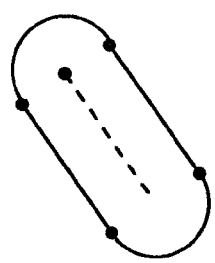
FIG. 15E is a diagram for explaining dilation processing of a side of a line segment.

The processing of the present step will be specifically described using FIG. 15A to FIG. 15E. First, such a side as illustrated in FIG. 15A is rotated with the starting point of the side as a center as illustrated in FIG. 15B so that an angle between an x-axis and the side becomes "0". In addition, as illustrated in FIG. 15C, sides are generated that are obtained by shifting parallel the side after the rotational shifting in the positive direction and the negative direction of a y-axis by the radius (the length of an arrowed dotted straight line) of the filled-in circle. In addition, as illustrated in FIG. 15D, with the starting point of the side before the parallel shifting as a center, the sides after the parallel shifting are rotated by the same angle in a direction opposite to FIG. 15B. In addition, processing in which edges are joined using a circular arc, as illustrated in FIG. 15E, is performed in Step S51.

On the other hand, when the side is a circular arc, the side dilation processing unit 113 performs processing for generating circular arcs obtained by elongating and contracting the radius of a circular arc by the radius of the filled-in circle (Step S49). A processing result is stored in the data storage unit 105. After that, the processing makes a transition to Step S51.

Figure 16A:
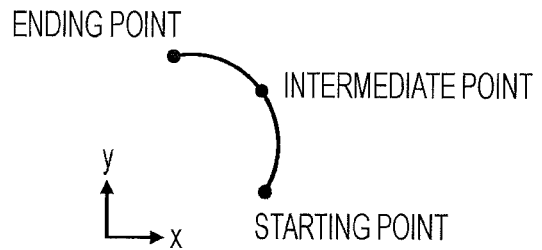
FIG. 16A is a diagram for explaining dilation processing of a side of a circular arc.
Figure 16B:
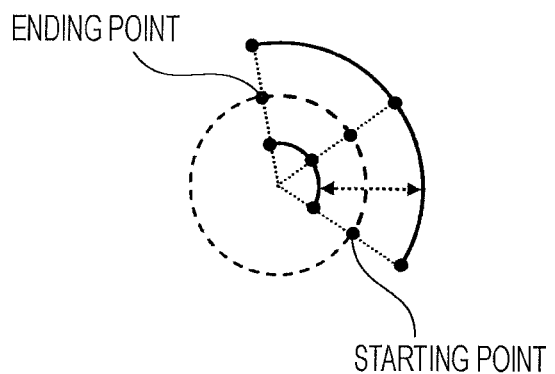
FIG. 16B is a diagram for explaining dilation processing of a side of a circular arc.
Figure 16C:
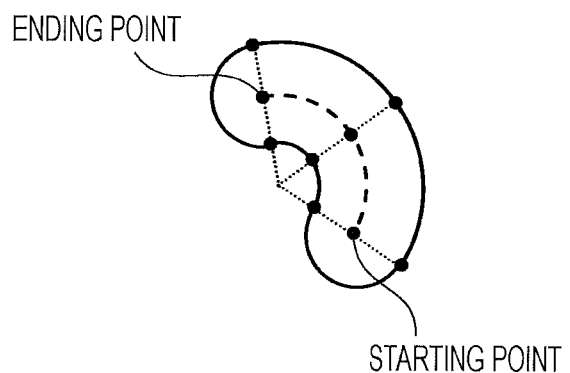
FIG. 16C is a diagram for explaining dilation processing of a side of a circular arc.

The processing of the present step will be specifically described using FIG. 16A to FIG. 16C. First, as illustrated in FIG. 16B, from such a circular arc as illustrated in FIG. 16A, a circular arc is generated whose radius is obtained by shortening the radius of such a circular arc as illustrated in FIG. 16A by an amount of the radius (the length of an arrowed dotted straight line) of the filled-in circle and a circular arc is generated whose radius is obtained by lengthening the radius of such a circular arc as illustrated in FIG. 16A by an amount of the radius (the length of an arrowed dotted straight line) of the filled-in circle. While the starting point, the intermediate point, and the ending point of the generated circular arc are calculated from the starting point, the intermediate point, and the ending point of the original circular arc, since this method has existed, the description thereof will be omitted. In addition, processing in which edges are joined using a circular arc, as illustrated in FIG. 16C, is performed in Step S51.

In addition, the side dilation processing unit 113 joins the end points of the generated line segments or circular arcs using circular arcs whose centers are both end portions of the identified side and whose radii are the same as the radius of the filled-in circle, thereby generating an oblong graphic (Step S51). A processing result is stored in the data storage unit 105.

After that, the corrected-graphic generation unit 103 determines whether an unprocessed corner exists (Step S53). When the unprocessed corner exists, the processing returns to Step S41. On the other hand, when no unprocessed corner exists, the processing returns to former processing. The data of the graphic generated in such a way as described above is stored in the data storage unit 105.

Figure 17:
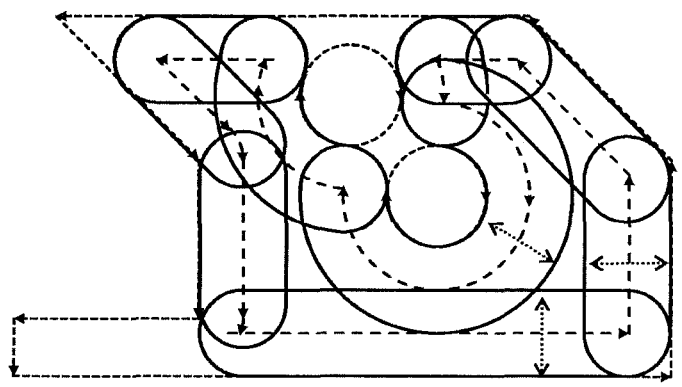
FIG. 17 is a diagram illustrating a graphic after processing at a third stage in the after-correction graphic generation is performed on a graphic of a processing target.

When such processing as described above is performed, such a graphic D as illustrated in FIG. 17 is generated from such a graphic C illustrated in FIG. 11. A shape is formed where the oblong graphics trace an external form with overlapping with one another. In this regard, however, a portion occurs where the oblong graphics do not overlap with each other. In addition, since the oblong graphic causes a corner to be rounded off, when the graphic A of a processing target is laid on the shape, some corners are lacked.

Returning to the description of the processing in FIG. 5, the corrected-graphic generation unit 103 instructs the graphic operation unit 117 to perform an OR operation (logical addition operation) of a graphic with respect to the graphic C generated in Step S5 and the graphic D generated in Step S7, generates an after-correction graphic E where a filling-in violation portion has been corrected, and stores the data of the after-correction graphic E in the data storage unit 105 (Step S9). As for the OR operation of a graphic, since a method may be used that is disclosed in, for example, Japanese Laid-open Patent Publication No. 2-132569, the detailed description thereof will be omitted.

Figure 18:
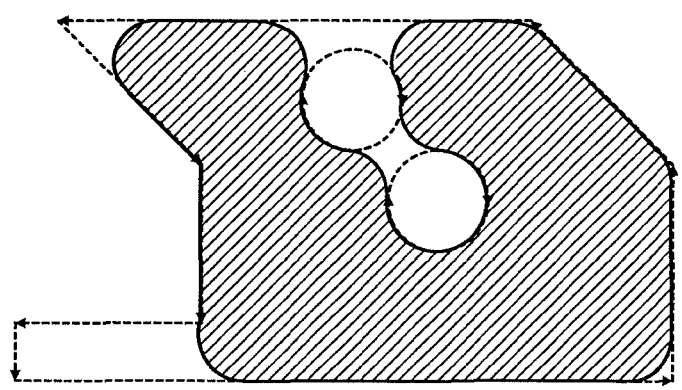
FIG. 18 is a diagram illustrating a graphic after processing at a fourth stage in the after-correction graphic generation is performed on a graphic of a processing target.

When the OR operation between the graphic C in FIG. 11 and the graphic D in FIG. 17 is performed, such a graphic E as illustrated in FIG. 18 is generated. In the graphic E, a filling-in width violation portion is removed, and an acceptable angle violation portion is removed.

In addition, the output unit 106 reads out the data of the graphic E, stored in the data storage unit 105, and outputs the data of the graphic E to an output device such as a display device or the like (Step S11). Such a graphic as illustrated in FIG. 18 is output to the display device or the like. In such a way as described above, it may be possible for a designer to automatically obtain a graphic subjected to correction, and the effort of correction is reduced.

In addition, in the processing illustrated above, since any more amount than a processing amount proportional to the logarithm of the number of corners×the number of corners may not be taken, a processing speed is speeded up.

Next, using FIG. 19 to FIG. 43, processing will be described in which a filling-in width violation portion and an acceptable angle violation portion in a processing target graphic are detected and displayed. In addition, it is assumed that the processing in FIG. 5 has been completed.

Figure 19:
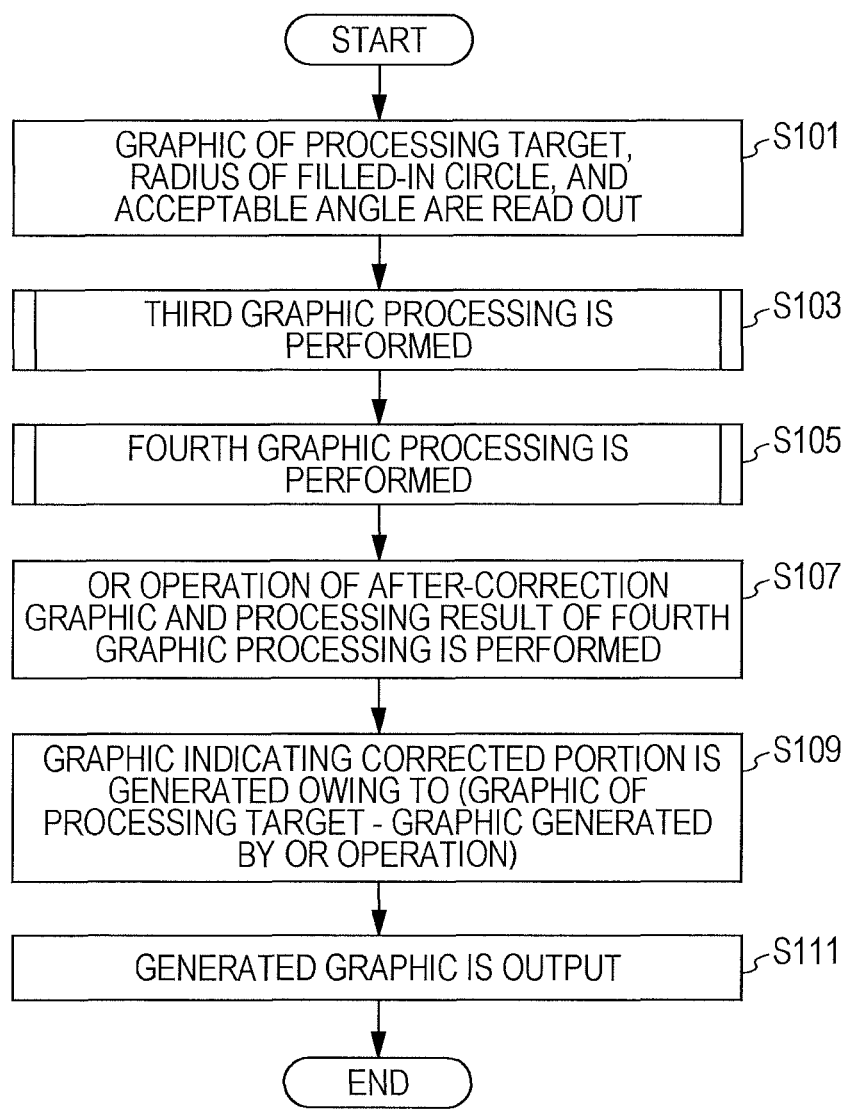
FIG. 19 is a diagram illustrating a processing flow of filling-in violation portion detection.

First, the violation portion detection unit 104 reads out the data of the graphic of a processing target from the graphic data storage unit 101, and reads out the values of the radius of a filled-in circle and an acceptable angle from the setting data storage unit 102 (FIG. 19: Step S101).

In addition, the violation portion detection unit 104 performs third graphic processing (Step S103). The third graphic processing is processing in which the parallel shifting of sides are performed and a circle is generated if, with respect to the point of intersection between the sides after the parallel shifting, the angle thereof before the parallel shifting is greater than or equal to the acceptable angle. The detail thereof will be described using FIG. 20 to FIG. 26.

Figure 20:
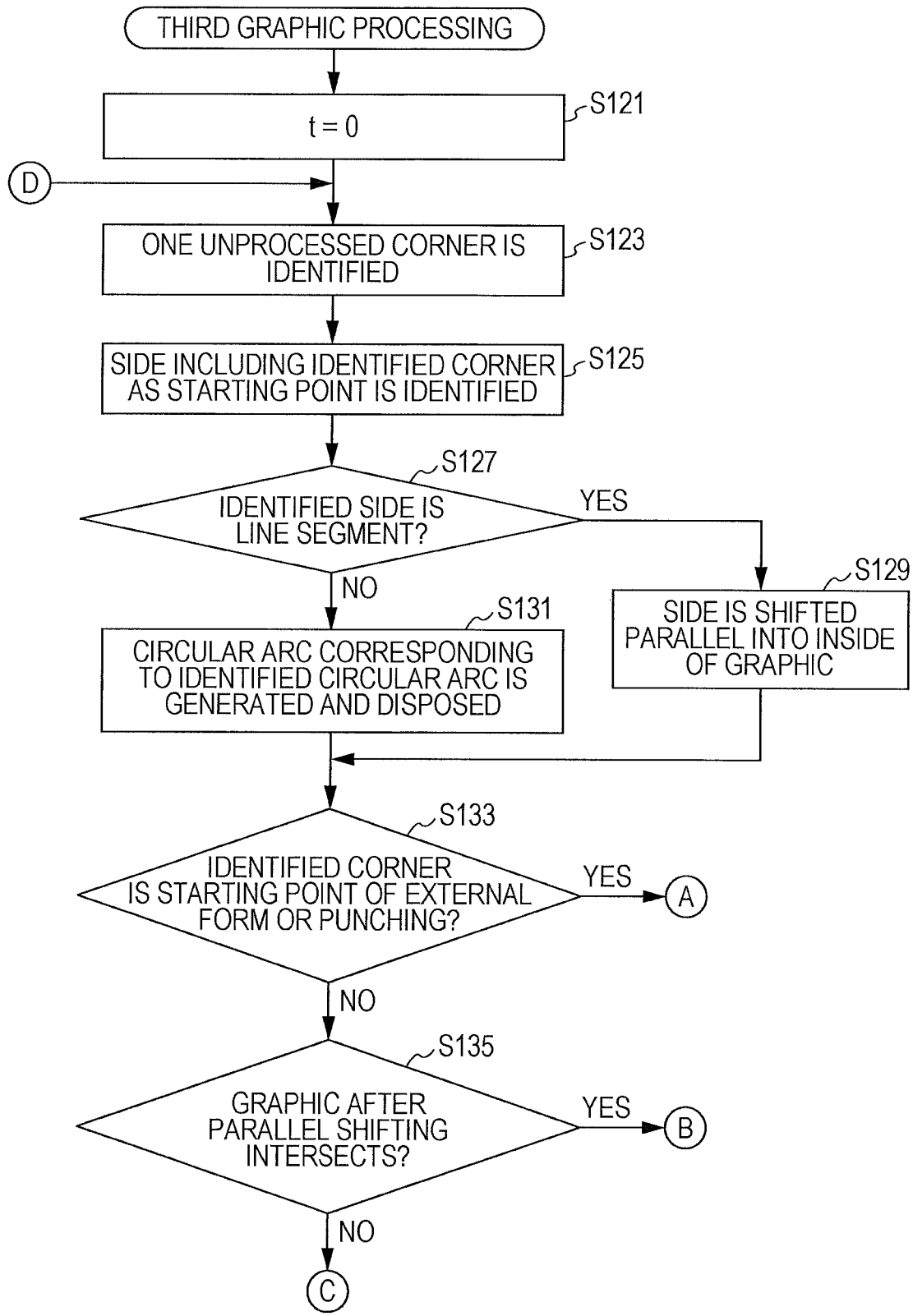
FIG. 20 is a diagram illustrating a processing flow of third graphic processing.

First, the violation portion detection unit 104 sets a flag t to "0" (FIG. 20: Step S121). The flag t is a flag indicating whether processing relates to an external form or a punching ending point, and if the processing relates to the external form or the punching ending point, the flag is set to "1".

In addition, the violation portion detection unit 104 identifies one unprocessed corner of the graphic of a processing target (Step S123). For example, it is assumed that the processing is performed in ascending order of corner number. In addition, the violation portion detection unit 104 identifies a side including the identified corner as a starting point (Step S125). In addition, the violation portion detection unit 104 instructs the side shift processing unit 111 to perform processing on the identified side.

In response to this, the side shift processing unit 111 determines whether the identified side is a line segment (Step S127). When the identified side is a line segment, the side shift processing unit 111 performs processing for causing the side to be shifted parallel into the inside of the graphic by the radius of the filled-in circle (Step S129). Since this processing is the same as Step S27, the detailed description thereof will be omitted. After that, the processing makes a transition to Step S133.

On the other hand, when the side is a circular arc, the side shift processing unit 111 generates and disposes a circular arc corresponding to the identified circular arc, thereby performing the parallel shift processing of the circular arc (Step S131). Since this processing is also the same as Step S29, the detailed description thereof will be omitted. After that, the processing makes a transition to Step S133.

Figure 21:
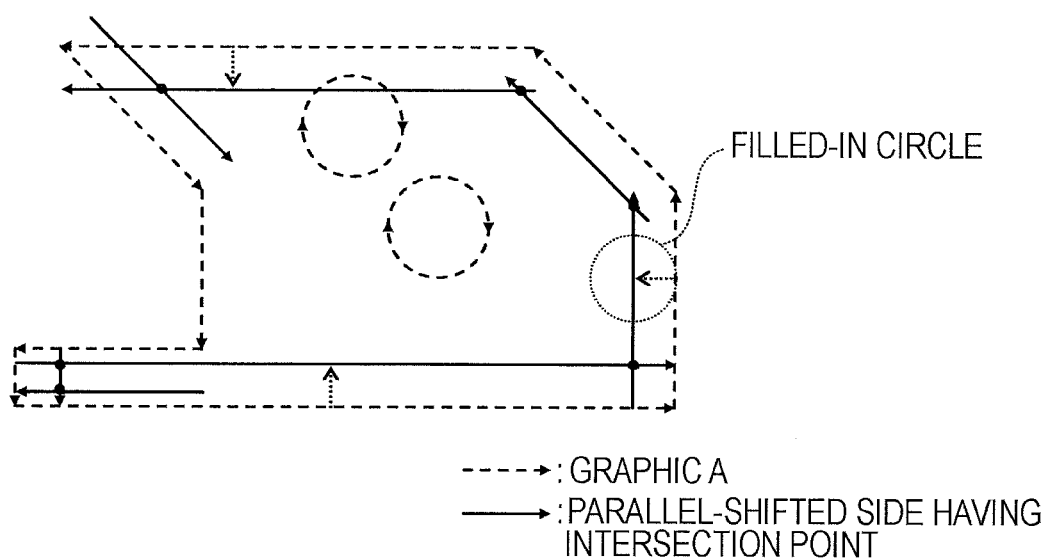
FIG. 21 is a diagram illustrating a graphic after processing at a first stage in filling-in violation portion detection is performed on a graphic of a processing target.

In addition, when the processing so far has been performed with respect to all side of the graphic of a processing target illustrated in FIG. 4, such a graphic as illustrated in FIG. 21 is obtained. In the example in FIG. 21, when, as described below, a side does not have an intersection point with another side after parallel shifting, since the side is excluded from the target of processing, the side to be excluded from the target of processing is not illustrated.

In addition, in the example in FIG. 21, a side after parallel shifting is not illustrated with respect to punching. This is because the side hardly influences the following processing and the description thereof is to be simplified, and actually, processing is also performed with respect to the punching.

In addition, the violation portion detection unit 104 confirms whether the identified corner is the starting point of an external form or punching (Step S133). When the identified corner is the starting point of the external form or punching, the processing makes a transition to Step S157 in FIG. 28 through a terminal A.

On the other hand, when the identified corner is not the starting point of the external form or punching, the violation portion detection unit 104 determines whether the side after this time's parallel shifting has an intersection point with a side most recently subjected to parallel shifting (Step S135). When the side after this time's parallel shifting has an intersection point with the side most recently subjected to parallel shifting, the processing makes a transition to processing in FIG. 22 through a terminal B. On the other hand, when the side after this time's parallel shifting does not have an intersection point with the side most recently subjected to parallel shifting, the processing makes a transition to processing in FIG. 28 through a terminal C.

Figure 33:
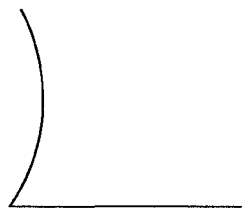
FIG. 33 is a diagram for explaining an angle formed by a circular arc.
Figure 34:
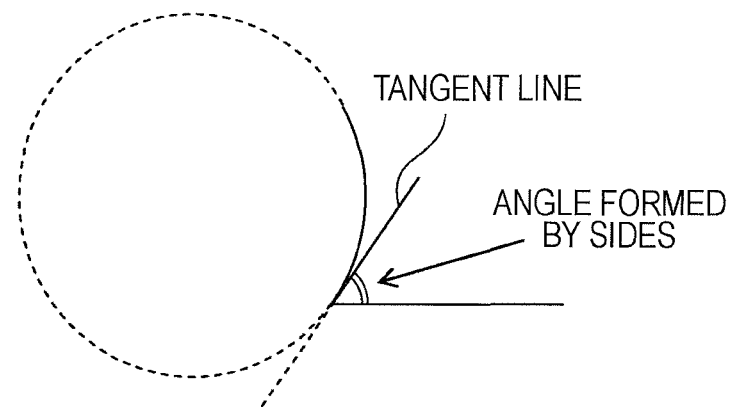
FIG. 34 is a diagram for explaining an angle formed by a circular arc.

Next, using FIG. 22, processing after the processing makes a transition through the terminal B will be described. Here, the violation portion detection unit 104 determines whether an angle between sides before the parallel shifting is less than or equal to the acceptable angle with respect to this intersection point (Step S137). As illustrated in FIG. 33, when the side is a circular arc, the tangent line of the circular arc is considered as a side, and an angle is obtained, as illustrated in FIG. 34. When the angle between the sides before the parallel shifting is less than or equal to the acceptable angle, the angle corresponds to violation, the processing makes a transition to Step S157 in FIG. 28 through the terminal A, without performing subsequent processing. On the other hand, when the angle between the sides before the parallel shifting is greater than the acceptable angle, since the angle has no problem, the violation portion detection unit 104 instructs the circular arc generation unit 114 to perform processing for generating a circular arc with respect to this intersection point. In response to this, the circular arc generation unit 114 generates a filled-in circle centered on this intersection point (Step S139). Since the radius of the filled-in circle is the same as the radius of the filled-in circle stored in the setting data storage unit 102, there is a possibility that a point of contact with a side before parallel shifting exists. For example, the circular arc generation unit 114 calculates a point of contact between the generated circle and a side before parallel shifting (Step S141). As illustrated in FIG. 23, when a filled-in circle is generated at an the point c of intersection between sides (solid lines) after parallel shifting, points d and e of contact with sides (dotted lines) before parallel shifting are calculated. In addition, a corner f between sides before parallel shifting exists between the points d and e of contact.

Figure 24:
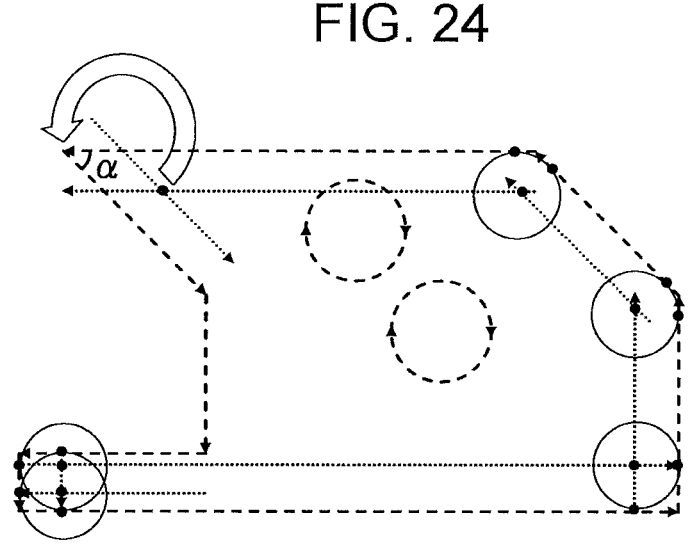
FIG. 24 is a diagram illustrating a graphic after processing at a second stage in the filling-in violation portion detection is performed on a graphic of a processing target.

When the processing so far has been performed on the graphic illustrated in FIG. 21, such a graphic as illustrated in FIG. 24 is obtained. In the example in FIG. 24, when the angle of a corner between sides before parallel shifting exceeds the acceptable angle, the filled-in circle is disposed at the point of intersection between sides after parallel shifting. At an intersection point located in the upper left part of the graphic, since the angle α of an corner between sides before parallel shifting is less than or equal to the acceptable angle, no filled-in circle occurs.

Figure 25:
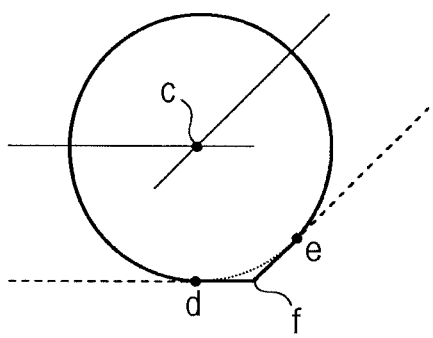
FIG. 25 is a diagram for explaining the generation of a circular arc graphic.

After that, from the corner between sides before parallel shifting, the calculated points of contact, and the generated circle (namely, the filled-in circle), the circular arc generation unit 114 generates a circular arc graphic surrounded by sides leading from the corner between sides before parallel shifting to the points of contact and the generated circle (Step S143). In the case of FIG. 23, such a circular arc graphic as illustrated in FIG. 25 is generated. Namely, a circular arc graphic is generated that is surrounded by a side fd, a side fe, and a circle centered on the intersection point C. A processing result is stored in the data storage unit 105.

Figure 26:
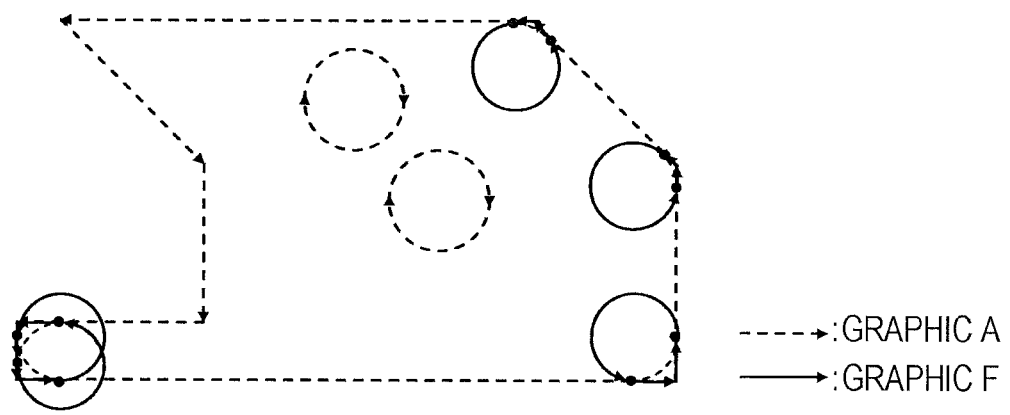
FIG. 26 is a diagram illustrating a graphic after processing at a third stage in the filling-in violation portion detection is performed on a graphic of a processing target.
Figure 27:
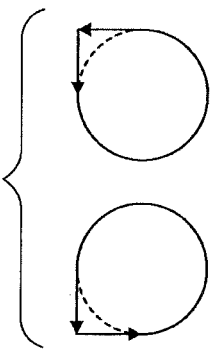
FIG. 27 is a diagram magnifying and resolving a portion of FIG. 26.

In addition, when Step S143 has been performed on a graphic illustrated in FIG. 24, such a graphic as illustrated in FIG. 26 is generated. In the example in FIG. 26, five circular arc graphics are generated with respect to five intersection points. When two circular arc graphics located in the lower left part are separated, it turns out that two such circular arc graphics as illustrated in FIG. 27 overlap with each other. Such a circular arc graphic as illustrated in FIG. 26 is processed as a graphic F.

Figure 22:
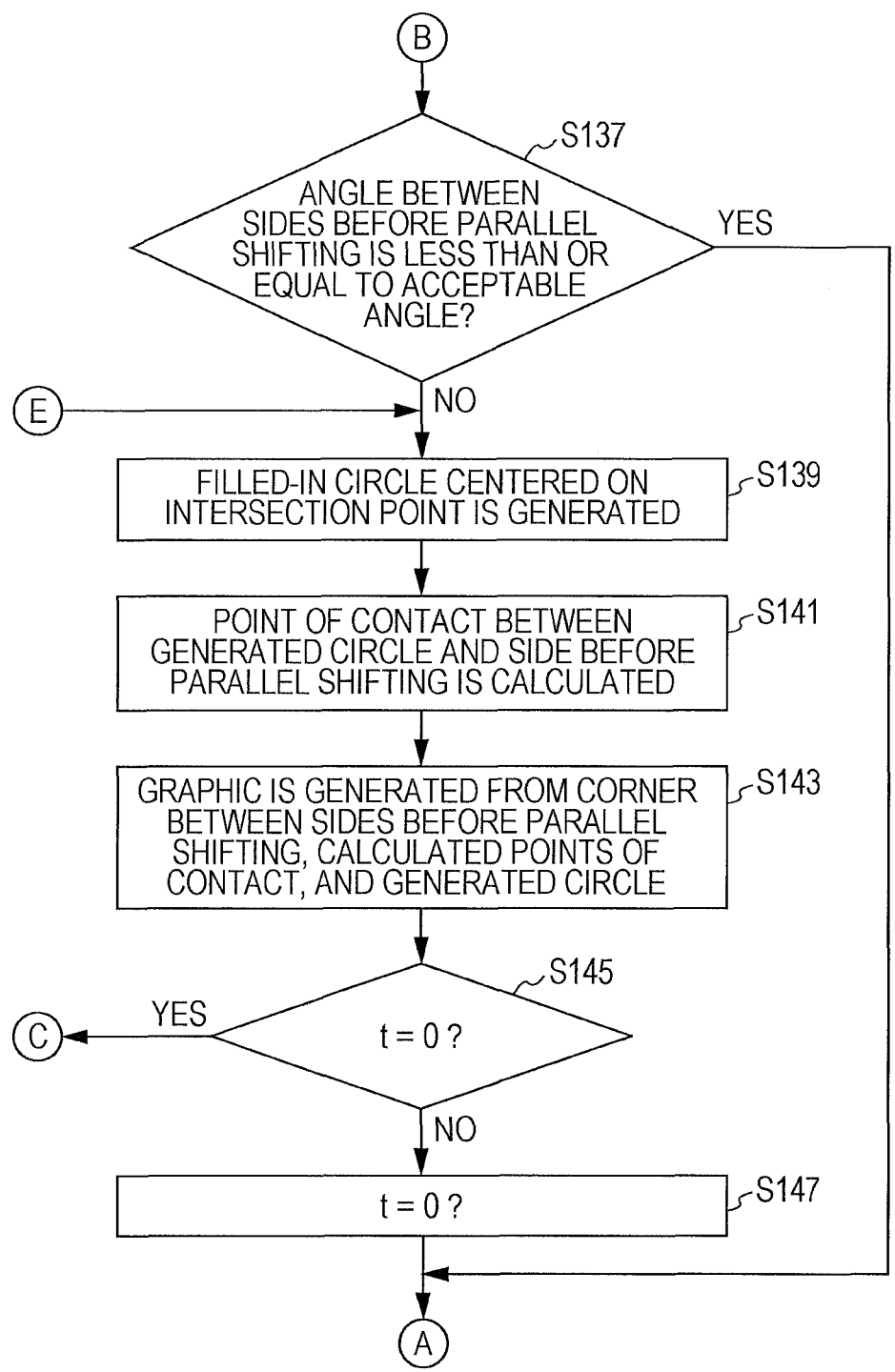
FIG. 22 is a diagram illustrating a processing flow of the third graphic processing.
Figure 23:
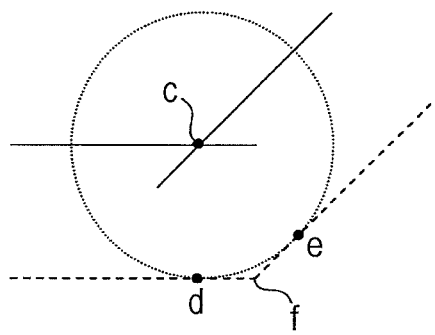
FIG. 23 is a diagram for explaining processing for generating a circle at the point of intersection between sides after parallel shifting.

Returning to the description of the processing in FIG. 22, the violation portion detection unit 104 determines whether the t is "0" (Step S145). When the t is "0", since the processing does not relate to the ending point of an external form or punching, the processing makes a transition to processing in FIG. 28 through the terminal C. On the other hand, when the t is "0", since processing relating to the ending point of an external form or punching has been performed, the violation portion detection unit 104 restores the t to "0" (Step S147), and the processing makes a transition to Step S157 in FIG. 28 through the terminal A.

Figure 28:
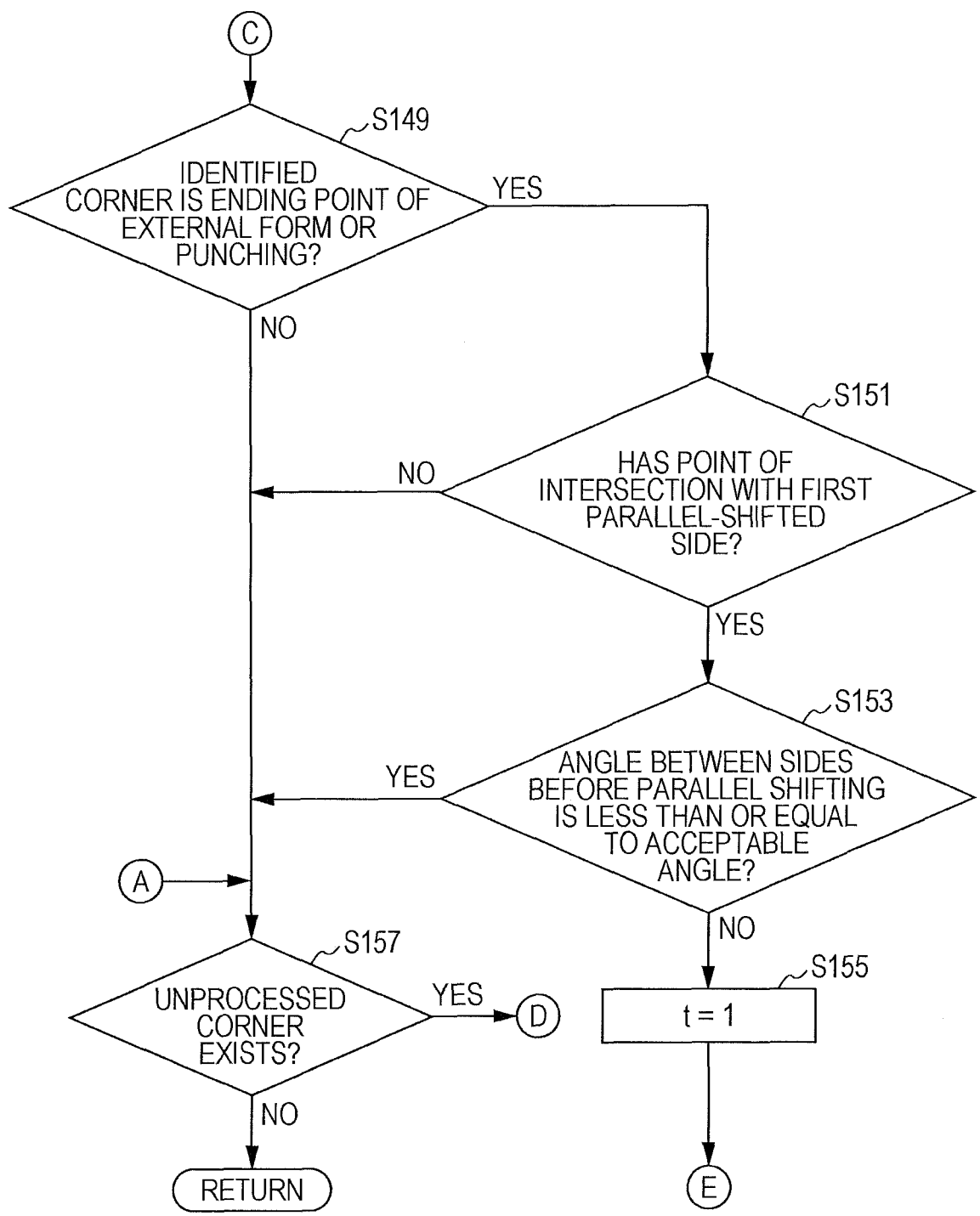
FIG. 28 is a diagram illustrating a processing flow of the third graphic processing.

Next, processing to which the processing makes a transition through the terminal C will be described using FIG. 28. The violation portion detection unit 104 confirms whether the identified corner is the ending point of an external form or punching (Step S149). When the identified corner is not the ending point of the external form or punching, the violation portion detection unit 104 determines whether an unprocessed corner exists (Step S157), and when the unprocessed corner exists, the processing returns to Step S123 through a terminal D.

On the other hand, when the identified corner is the ending point of the external form or punching, the violation portion detection unit 104 determines whether a side shifted parallel at this time has the point of intersection with a first side shifted parallel with respect to this external form or punching (Step S151). When the side shifted parallel at this time does not have the point of intersection with the first side shifted parallel with respect to this external form or punching, the processing makes a transition to Step S157. On the other hand, when the side shifted parallel at this time has the point of intersection with the first side shifted parallel with respect to this external form or punching, the violation portion detection unit 104 determines whether the angle of a corner between sides before parallel shifting is less than or equal to the acceptable angle (Step S153). When the angle of a corner between sides before parallel shifting is less than or equal to the acceptable angle, since processing is not to be performed in which a circle is generated or the like, the processing makes a transition to Step S157. On the other hand, when the angle of a corner between sides before parallel shifting exceeds the acceptable angle, the violation portion detection unit 104 sets the flag t to "1" (Step S155), and the processing makes a transition to Step S139 in FIG. 22 through a terminal E. Accordingly, a circle is generated, and a circular arc graphic is generated.

By performing such processing as described above, as described above, when the angle of a corner between sides before parallel shifting exceeds the acceptable angle, the circular arc graphic F turns out to be generated on the periphery of the point of intersection between parallel-shifted sides, as illustrated in FIG. 26.

Returning to the description of the processing in FIG. 19, the violation portion detection unit 104 performs fourth graphic processing (Step S105). The fourth graphic processing is processing in which a circular arc graphic F contained by the graphic A of a processing target is identified from among circular arc graphics F generated in the third graphic processing. The detail of this processing will be described using FIG. 29 to FIG. 43.

Figure 29:
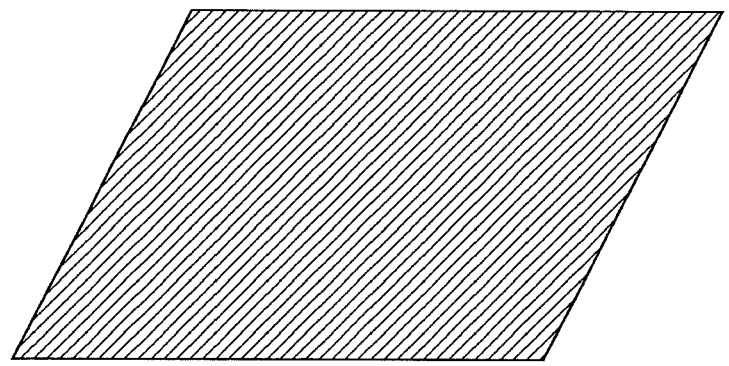
FIG. 29 is a diagram for explaining fourth graphic processing.
Figure 30:
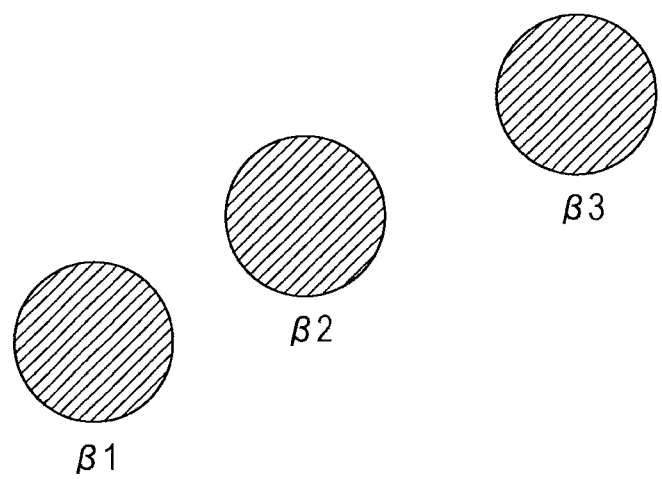
FIG. 30 is a diagram for explaining the fourth graphic processing.
Figure 31:
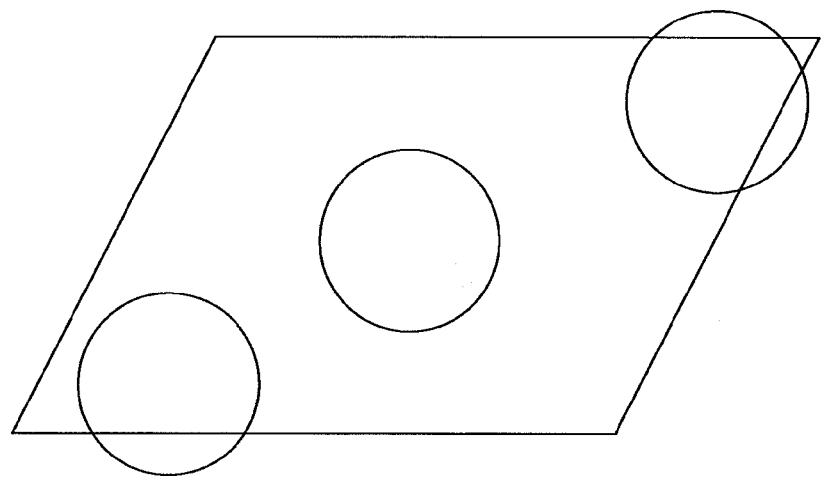
FIG. 31 is a diagram for explaining the fourth graphic processing.
Figure 32:
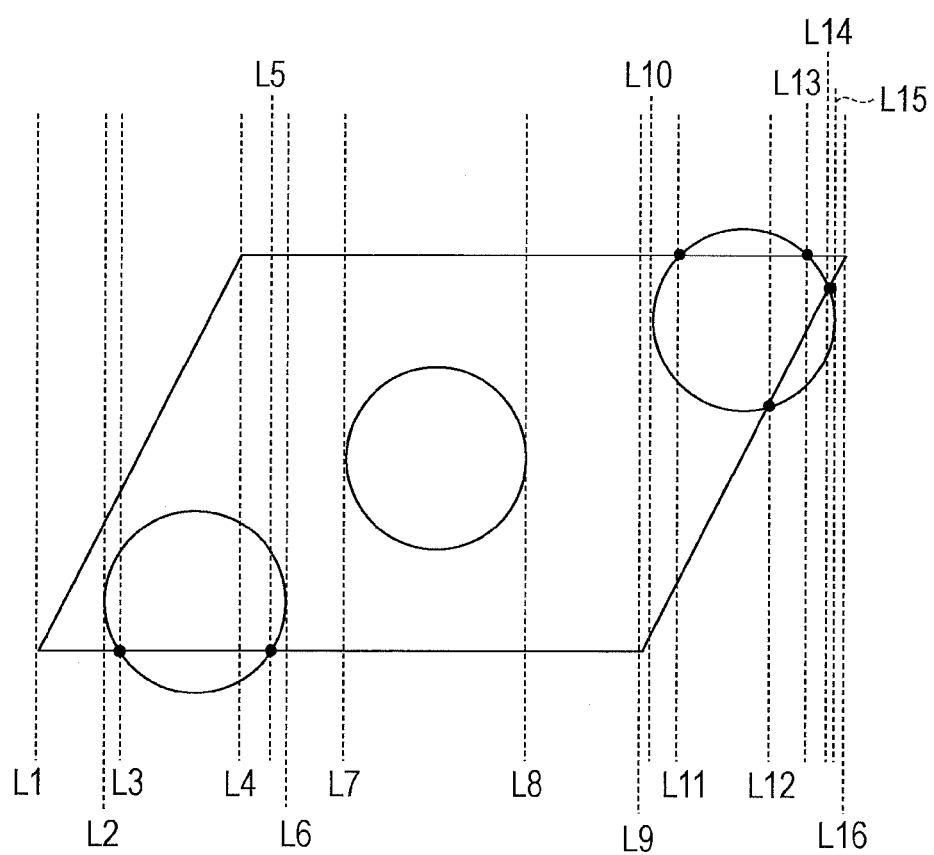
FIG. 32 is a diagram for explaining the fourth graphic processing.

For example, a case will be considered in which it is determined whether such graphics (graphics β1 to β3) as illustrated in FIG. 30 are contained in such a graphic (referred to as a graphic α) as illustrated in FIG. 29. It is assumed that the graphic α and the graphics β1 to β3 are disposed as illustrated in FIG. 31. In addition, as illustrated in FIG. 32, by applying a flatbed scanning method in ascending order of x coordinate value, at the individual corners of the graphic α and the graphics β1 to β3, the points of intersection between individual sides on sweep lines passing through the individual corners of the graphic α and the graphics β1 to β3 and being parallel to a y-axis are calculated owing to an existing Bentley-Ottman intersection determination. With respect to the intersection points of the graphic α and the graphics β1 to β3, sweep lines are also set, and intersection points on the sweep lines are calculated in the same way. In the example in FIG. 32, sweep lines L1 to L16 are set. In addition, the intersection points on the individual sweep lines are sorted in ascending order of y coordinate.

In addition, when the y coordinates are the same, the intersection points on individual sweep lines are sorted in ascending order of angle formed with a sweep line. In the case of the point of intersection between a circular arc and a sweep line, an angle formed by the meeting of the tangent line of the circular arc with the sweep line is calculated and determination is performed.

After that, while, using the flag f, it is determined whether a graphic is located outside or inside of the graphic α, when the graphic β is detected on the outside of the graphic α, it is determined that the graphic β is not contained.

Figures 35, 36, 37, 38:
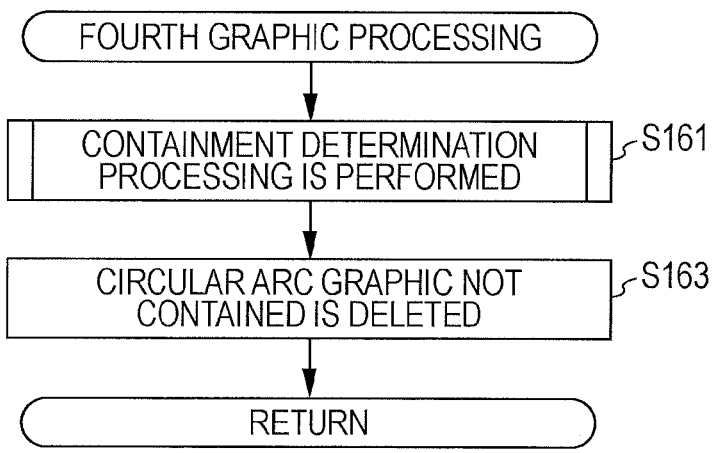
FIG. 35 is a diagram illustrating an example of a graphic table.
FIG. 36 is a diagram for explaining fourth graphic processing.
FIG. 37 is a diagram for explaining the fourth graphic processing.
FIG. 38 is a diagram illustrating a processing flow of the fourth graphic processing.

For example, a graphic table relating to the graphic β as illustrated in FIG. 35 is prepared. In addition, for example, the sweep line L3 is focused on, and sides intersecting with the sweep line L3 are sorted in ascending order of y coordinate value. As understood from FIG. 32, sides are sequentially sorted in the order as illustrated in FIG. 36. Namely, a side of the graphic β1, a side of the graphic α, a side of the graphic β1, and a side of the graphic α are arranged in this order. The order of the side of the graphic β1 and the side of the graphic α is determined in ascending order of angle formed with the sweep line L3, as described above. When this sweep line L3 is processed, the side of the graphic β1 emerges before the graphic β1 falls within the graphic α, namely, in a state in which a flag is "0". Therefore, it is understood that the graphic β1 is not contained within the graphic α. Namely, when the sweep line L3 is processed, "1" is set with respect to the graphic β1 in the graphic table and it is recorded that the graphic β1 is not contained, as illustrated in FIG. 37. The graphic table and the sort result of sides on individual sweep lines, described above, are stored in a storage device such as a main memory or the like in the graphic processing device 100.

Figure 39:
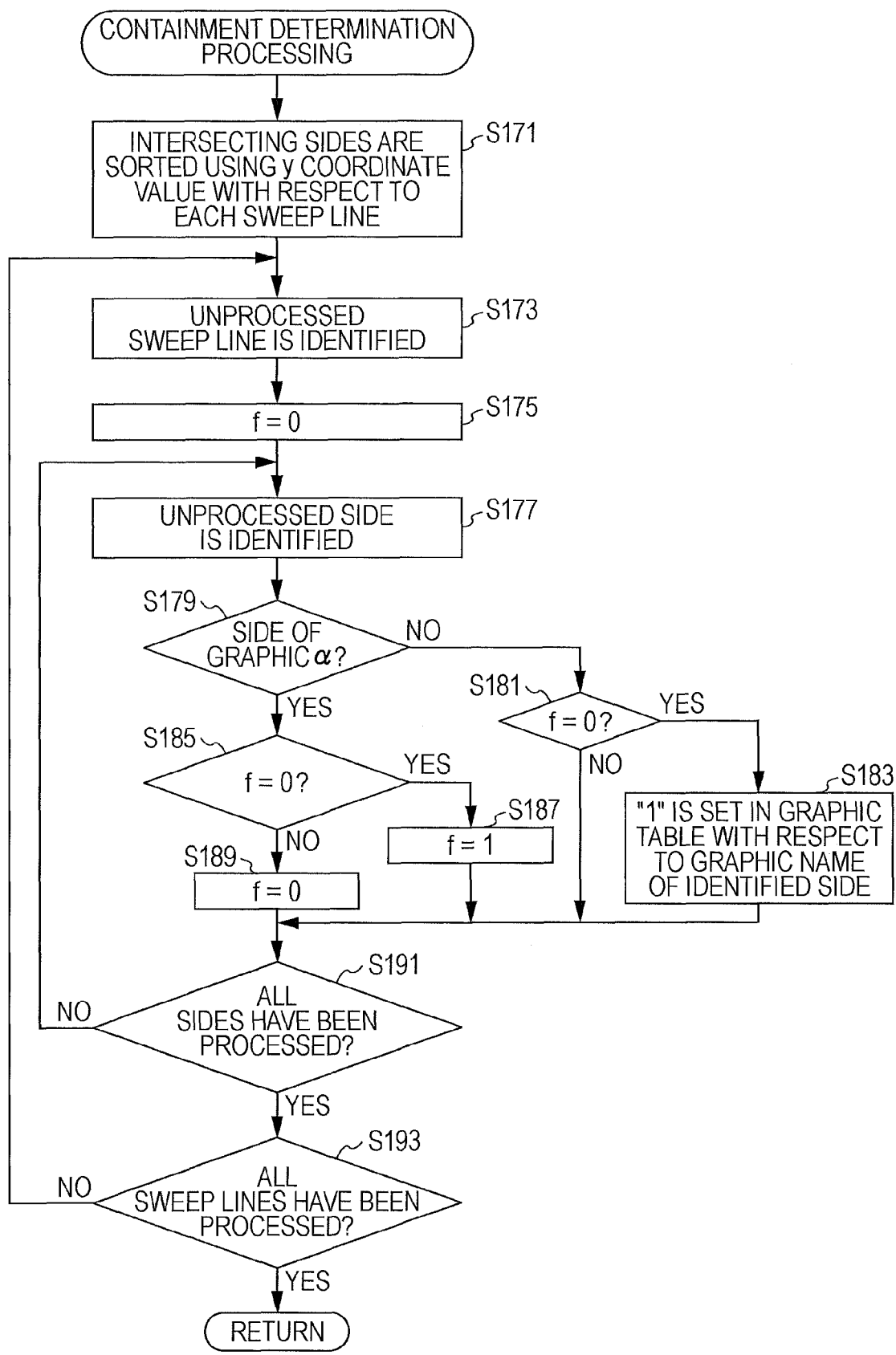
FIG. 39 is a diagram illustrating a processing flow of containment determination processing.

The above-mentioned processing is performed in accordance with such processing flows as illustrated in FIG. 38 to FIG. 39. First, the violation portion detection unit 104 causes the containment determination unit 115 to perform containment determination processing for determining whether the circular arc graphic F is contained in the graphic A of a processing target (FIG. 38: Step S161). In addition, the violation portion detection unit 104 deletes the circular arc graphic F determined not to be contained in the graphic A of a processing target by the containment determination processing (Step S163). In addition, the processing returns to former processing.

Next, using FIG. 39, the containment determination processing will be described. First, the containment determination unit 115 sets sweep lines parallel to the y-axis in ascending order of x coordinate value with respect to a corner and the point of intersection between the graphic A and the circular arc graphic F, as described above. In addition to this, the containment determination unit 115 sorts an intersecting side using a y coordinate value with respect to each sweep line, and stores a sort result in a storage device such as a main memory or the like in the graphic processing device 100, for example (Step S171).

In addition, the containment determination unit 115 identifies one unprocessed sweep line (Step S173). In addition, the containment determination unit 115 sets the flag f to "0" (Step S175). As described above, the flag f is a flag for setting the outside or the inside of the graphic A, "0" indicates the outside of the graphic A, and "1" indicates the inside of the graphic A.

In addition, the containment determination unit 115 identifies one unprocessed side from near the top of a sort result with respect to the identified sweep line (Step S177). After that, the containment determination unit 115 determines whether the identified side is the side of the graphic α (the graphic A of a processing target) (Step S179). When the identified side is not the side of the graphic a, the containment determination unit 115 determines whether the flag f is "0" (Step S181). When the flag f is "1", the processing makes a transition to Step S191. On the other hand, when the flag f is "0", it turns out that the graphic β is detected on the outside of the graphic α. Therefore, the containment determination unit 115 sets "1" in the graphic table with respect to the graphic name of the identified side (Step S183). Namely, it is set that the graphic of the identified side is not contained. In addition, the processing makes a transition to Step S191.

On the other hand, when the identified side is the side of the graphic α, the containment determination unit 115 determines whether the flag f is "0" (Step S185). When the flag f is "0", the containment determination unit 115 sets the flag f to "1" (Step S187). In addition, the processing makes a transition to Step S191. On the other hand, when the flag f is "1", the containment determination unit 115 sets the flag f to "0" (Step S189). In addition, the processing makes a transition to Step S191. Namely, when the side of the graphic α is detected and the identified side has been already located on the inside of the graphic α, the flag is set to "0" so as to indicate that the identified side gets outside of the graphic α. On the other hand, when the identified side has been located on the outside of the graphic α, the flag is set to "1" so as to indicate that the identified side falls within the graphic α.

In addition, the containment determination unit 115 determines whether all sides have been processed (Step S191), and when an unprocessed side exists, the processing returns to Step S177. On the other hand, when all sides have been processed, the containment determination unit 115 determines whether all sweep lines have been processed (Step S193). When an unprocessed sweep line exists, the processing returns to Step S173. On the other hand, when all sweep lines have been processed, the processing returns to former processing.

By performing such processing described above, a state occurs in which, in the graphic table, "1" is set with respect to a graphic determined not to be contained and "0" is set with respect to a graphic determined to be contained.

Namely, a circular arc graphic F where "1" is set in the graphic table is deleted in Step S163 in FIG. 38. The circular arc graphic F after deletion is stored in the data storage unit 105, as a graphic G.

Figure 40:
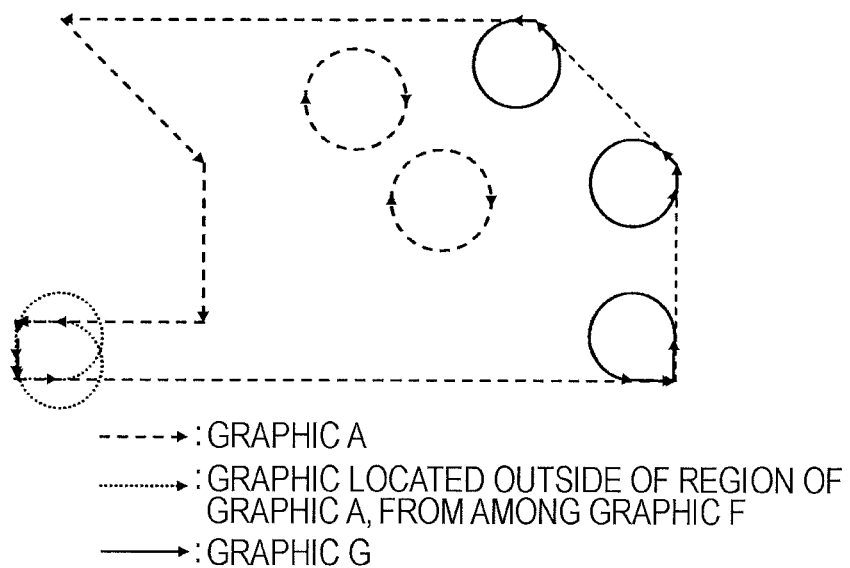
FIG. 40 is a diagram illustrating a graphic after processing at a fourth stage in the filling-in violation portion detection is performed on a graphic of a processing target.

In the case of such a circular arc graphic as illustrated in FIG. 26, since not being contained in the graphic A, two circular arc graphics located in the lower left part are deleted, as illustrated in FIG. 40. A graphic after deletion is defined as the graphic G. In addition, a time proportional to the logarithm of the number of corners×the number of corners may be taken to perform Step S163.

Returning to the description of the processing in FIG. 19, the violation portion detection unit 104 causes an OR operation (logical addition operation) to be performed on the after-correction graphic E stored in the data storage unit 105 and the graphic G that is the processing result of the fourth graphic processing, thereby generating a graphic H, and stores the data of the graphic H in the data storage unit 105 (Step S107).

Figure 41:
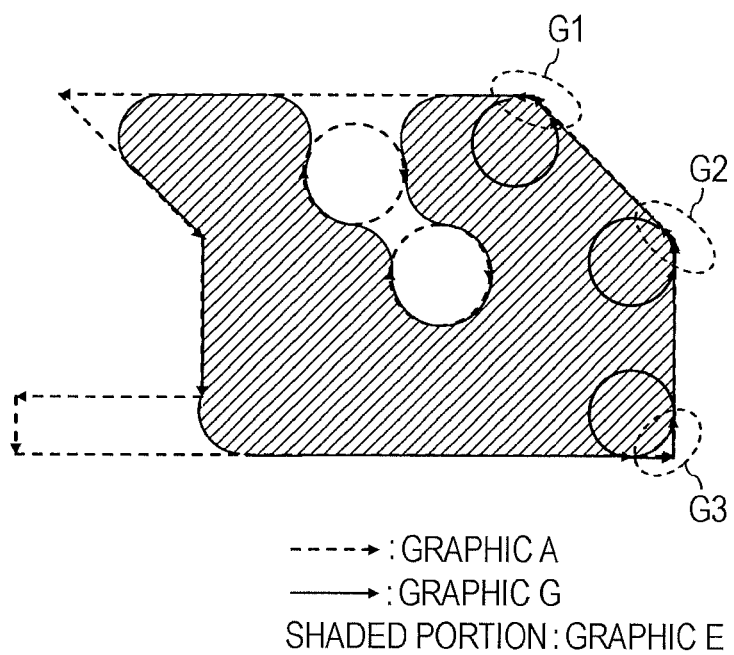
FIG. 41 is a diagram for explaining an OR operation of a graphic.

In FIG. 41, the graphic E and the graphic G, generated in the processing so far, are illustrated with being laid on each other. When the graphic E and the graphic G are laid on each other, while, as illustrated by dotted circles G1 to G3, corner portions are rounded off in the graphic E, the corner portions are included in the graphic G. Accordingly, if the OR operation is performed, the graphic H turns out to be generated that is obtained by adding the corner portions to the graphic E, as illustrated in FIG. 42.

In addition, from the graphic A stored in the graphic data storage unit 101 and the graphic H stored in the data storage unit 105 and generated owing to the OR operation in Step S107, the violation portion detection unit 104 causes the graphic operation unit 117 to perform graphic operation corresponding to (the graphic A–the graphic H), generates a graphic I used for indicating a corrected portion, and stores the data of the graphic I in the data storage unit 105 (Step S109).

More specifically, the violation portion detection unit 104 outputs the graphic data of the graphic H to the graphic data inversion unit 116 to invert the order of corners in the graphic data. Specifically, the order of corners relating to the external form is rearranged clockwise, and the order of corners relating to the punching is rearranged counterclockwise. In addition, the violation portion detection unit 104 outputs the processing result of the graphic H and the data of the graphic A to the graphic operation unit 117. In response to this, the graphic operation unit 117 deletes sides relating to clockwise corners with respect to the external form, and deletes sides relating to counterclockwise corners with respect to the punching, thereby performing a difference operation relating to graphics, such as (the graphic A–the graphic H).

Figure 42:
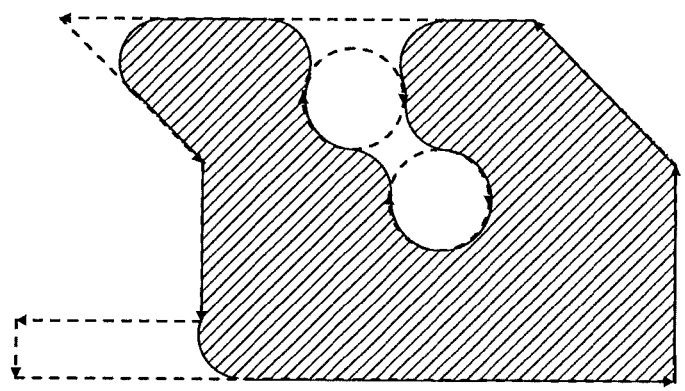
FIG. 42 is a diagram illustrating a graphic after processing at a fifth stage in the filling-in violation portion detection is performed on a graphic of a processing target.
Figure 43:
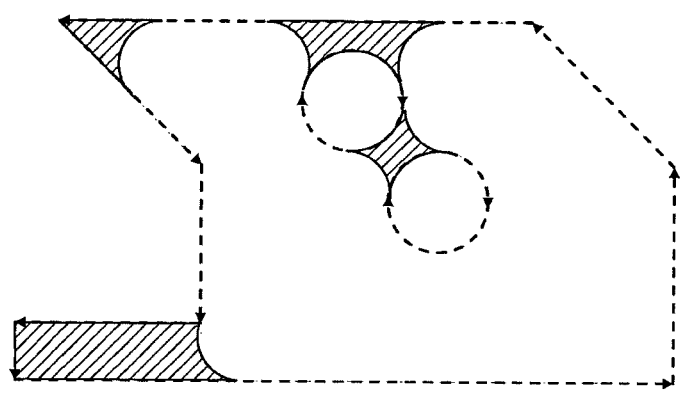
FIG. 43 is a diagram illustrating a graphic after processing at a sixth stage in the filling-in violation portion detection is performed on a graphic of a processing target.

The result of the graphic A–the graphic H, illustrated in FIG. 42, becomes such a graphic I as illustrated in FIG. 43. A shaded portion is the graphic I, and indicates portions corresponding to filling-in width violation and angle violation.

The output unit 106 outputs, to an output device such as a display device or the like, the data of the graphic I stored in the data storage unit 105 and generated in Step S109 (Step S111). In this way, it may be possible for a designer to easily understand a problematic position.

In this way, it may be possible to perform the correction of the filling-in violation portion of a plane pattern (namely, to correct the filling-in width violation portion and to round off a portion less than or equal to the acceptable angle), using the shift and the generation of a graphic and graphic arithmetic processing. In addition, since a time proportional to the number of corners may be taken to perform each of the parallel shift processing of sides and the processing for dilating sides and a time proportional to the logarithm of the number of corners×the number of corners may be taken to perform a graphic operation, it may be possible to suppress an operation time to a time proportional to the logarithm of the number of corners×the number of corners. Furthermore, in the present embodiment, since it may be possible to simultaneously round off the plane pattern, a round-off operation may not be separately performed.

The detection of the filling-in width violation portion and the acceptable angle violation portion of the plane pattern may also be performed using the shift and the generation of a graphic and graphic arithmetic processing. In addition, since a time proportional to the number of corners may be taken to perform the parallel shift processing of sides and the processing for generating circular arc graphics, a time proportional to the logarithm of the number of corners×the number of corners may be taken to perform the containment determination processing, and a time proportional to the logarithm of the number of corners×the number of corners may be taken to perform a graphic operation, it may be possible to suppress an operation time to a time proportional to the logarithm of the number of corners×the number of corners.

While the embodiment of the present technology has been described as above, the present technology is not limited to this embodiment. For example, the functional block in FIG. 2 is just an example, and actually the functional block may not coincide with a program module configuration, in some cases. In addition, as long as a processing result does not change, the processing flow may also be performed in a different order or in parallel.

For example, the processing of the corrected-graphic generation unit 103 and a portion of the processing of the violation portion detection unit 104 (processing before an after-correction graphic is used) may also be performed in parallel.

Furthermore, the above-mentioned function may not be performed using one computer, but may also be performed using a plurality of computers.

Figure 44:
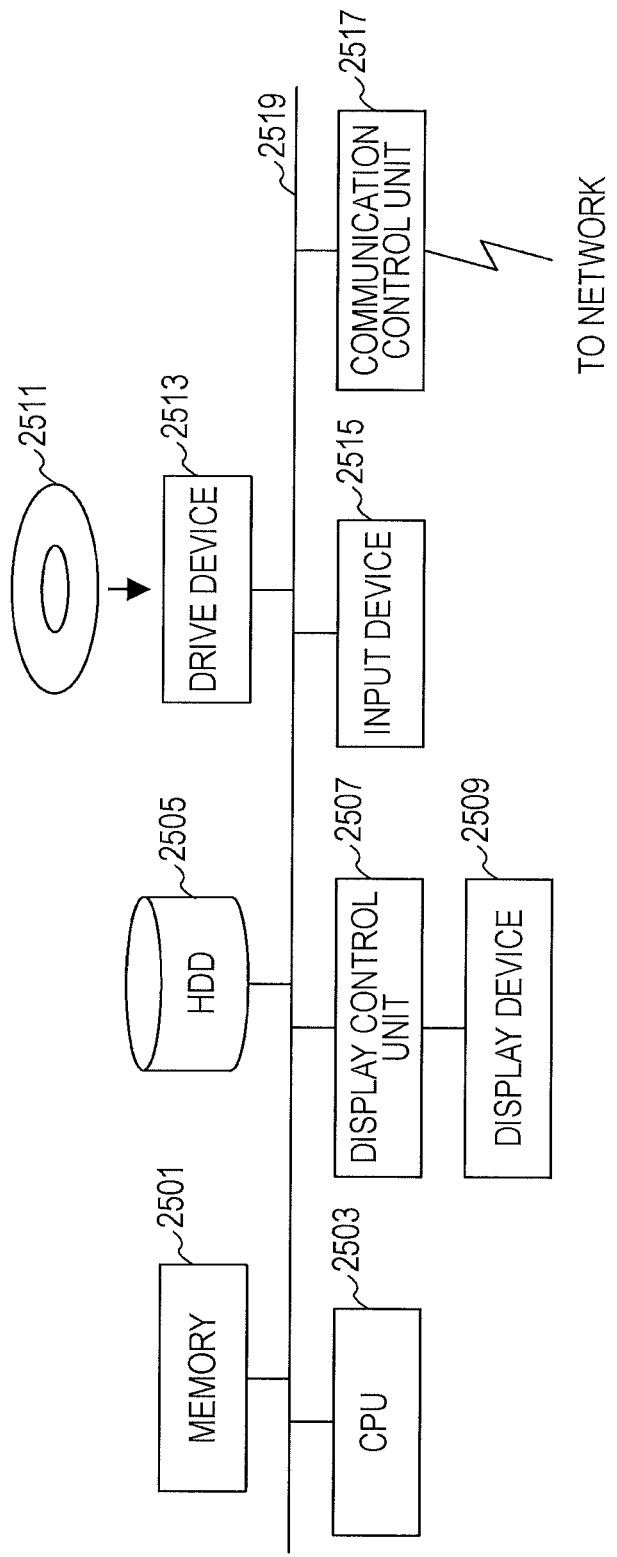
FIG. 44 is a functional block diagram of a computer.

In addition, the above-mentioned graphic processing device 100 is a computer device, and as illustrated in FIG. 44, a memory 2501, a CPU 2503, a hard disk drive (HDD) 2505, a display control unit 2507 connected to a display device 2509, a drive device 2513 used for a removable drive 2511, an input device 2515, and a communication control unit 2517 used for connecting to a network are connected to one another through a bus 2519. An operating system (OS) and an application program used for performing the processing in the present embodiment are stored in the HDD 2505, and are read from the HDD 2505 into the memory 2501 when being executed by the CPU 2503. In response to the content of processing of the application program, the CPU 2503 controls and causes the display control unit 2507, the communication control unit 2517, and the drive device 2513 to perform predetermined operations. In addition, while being mainly stored in the memory 2501, data being subjected to processing may also be stored in the HDD 2505. In the embodiment of the present technology, the application program used for performing the above-mentioned processing is stored in a computer-readable removable disk 2511 and distributed, and is installed from the drive device 2513 into the HDD 2505. In some cases, the application program is also installed into the HDD 2505 through a network such as Internet or the like and the communication control unit 2517. Hardware such as the CPU 2503, the memory 2501, and the like and programs such as the OS and the application program, described above, organically collaborate with one another, and hence such a computer device realizes the above-mentioned various kinds of functions.

The summary of the above-mentioned present embodiment is as follows.

A graphic processing method according to the present embodiment includes (A) a graphic generation step that generates the data of a second graphic identified by causing each of sides of a first graphic relating to data stored in a data storage unit storing the first graphic formed by a plurality of sides to be shifted by a certain length in a direction toward the inside of the first graphic and by tracing, in a certain direction, the sides after the shifting and the points of intersection between the sides after the shifting and that stores the data of the second graphic in the data storage unit, (B) a step that generates the data of a third graphic by linking end points of two second sides, using a circular arc that is centered on an end point of a first side of the second graphic relating to the data stored in the data storage unit and whose radius is a certain length, the two second sides being obtained by causing the first side to be shifted to both sides by the certain length, and that stores the data of the third graphic in the data storage unit, and (C) a step that generates the data of a fourth graphic by performing a logical addition operation between the second graphic and the third graphic, which relate to the data stored in the data storage unit, the logical addition operation relating to a graphic, and that stores the data of the fourth graphic in the data storage unit.

In this way, the fourth graphic in which a filling-in width violation portion and an acceptable angle violation portion in the first graphic are suitably corrected turns out to be automatically generated at a fast rate.

Furthermore, the present graphic processing method may also further include (D) a step that generates the data of a fifth graphic by causing each of the sides of the first graphic relating to the data stored in the data storage unit to be shifted by a certain length in a direction toward the inside of the first graphic, by generating a circle whose radius is a certain length and that is centered on an intersection point where an angle between sides before the shifting is greater than an acceptable angle, from among the points of intersection between the sides after the shifting, and by identifying a closed region surrounded by the circle and the sides before the shifting, and that stores the data of the fifth graphic data in the data storage unit, (E) a step that generates the data of a sixth graphic by performing a logical addition operation between the fifth graphic contained within the first graphic, from among the fifth graphic relating to the data stored in the data storage unit, and the fourth graphic relating to the data stored in the data storage unit, the logical addition operation relating to a graphic, and that stores the data of the sixth graphic data in the data storage unit, and (F) a step that generates the data of a seventh graphic by performing a difference operation relating to a graphic, the difference operation removing the sixth graphic relating to the data stored in the data storage unit from the first graphic relating to the data stored in the data storage unit, and that stores the data of the seventh graphic data in the data storage unit.

In this way, the seventh graphic indicating the filling-in width violation portion and the acceptable angle violation portion in the first graphic turns out to be automatically generated at a fast rate.

In addition, in some cases, the data of the above-mentioned graphic may include the data of corners of an external form in the order of a first direction and include the data of corners of punching in the order of a second direction opposite to the first direction. In this case, in some cases, the above-mentioned graphic generation step may include a step that generates the data of the second graphic identified by tracing in the first direction with respect to a plurality of intersection points relating to the external form, from among the points of intersection between the sides after the shifting, and a side linking the intersection points. In this way, it is possible to easily generate the second graphic.

Furthermore, the above-mentioned graphic generation step may include a step that connects the end points of the sides after the shifting using a circular arc. When a side after the shifting has no intersection point, the side of the external form or punching after the shifting is suitably interlinked using such a circular arc.

In addition, a program may be created that is used for causing the computer to perform such processing as described above, and the corresponding program is stored in, for example, a computer-readable storage medium or a storage device such as a flexible disk, an optical disk such as a CD-ROM or the like, a magnetooptical disk, a semiconductor memory (for example, a ROM), a hard disk, or the like. In addition, data being subjected to processing is temporarily stored in a storage device such as a RAM or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A graphic processing device comprising;
a memory which stores data of a first graphic; and
a processor which executes a process including
generating data of a second graphic identified by shifting each of a plurality of first sides of the first graphic stored in the memory by a certain length in a direction toward an inside of the first graphic and by tracing, in a certain direction, the first sides after the shifting and intersection points between the first sides after the shifting,
generating data of a third graphic by shifting each of a plurality of second sides of the second graphic to both sides of each of the second sides by the certain length and by linking end points of the second sides after the shifting using a circular arc which is centered on an end point of the second side before the shifting and which has a radius of the certain length,
generating data of a fourth graphic by performing a logical addition operation relating to a graphic between the second graphic and the third graphic, and
outputting the first, second, third, or fourth graphic to a display device.

2. The graphic processing device according to claim 1, wherein
the process further includes
generating data of a fifth graphic by shifting each of the first sides of the first graphic by the certain length in the direction toward the inside of the first graphic, by generating a circle which has a radius of the certain length and which is centered on the intersection point between the first sides after the shifting where an angle between the first sides before the shifting is greater than an acceptable angle and by identifying a closed region surrounded by the circle and the first sides before the shifting,
generating data of a sixth graphic by performing a logical addition operation relating to a graphic between the fourth graphic and the fifth graphic contained within the first graphic,
generating data of a seventh graphic by performing a difference operation relating to a graphic, the difference operation removing the sixth graphic from the first graphic, and
outputting the fifth, sixth, or seventh graphic to the display device.

3. The graphic processing device according to claim 1, wherein
the data of the first graphic includes data of corners of an external form in order of tracing the external form in a first direction and includes data of corners of a punching in order of tracing the punching in a second direction opposite to the first direction, and the generating the data of the second graphic includes
generating the data of the second graphic identified by tracing, in the first direction, the first sides after the shifting and the intersection points between the first sides after the shifting where the first sides before the shifting and the intersection points between the first sides before the shifting are contained in the external form.

4. The graphic processing device according to claim 1, wherein
the generating the data of the second graphic includes
connecting end points of the first sides after the shifting, using a circular arc.

5. A graphic processing method using a plurality of first sides of a first graphic stored in a data storage unit, the method comprising;
generating data of a second graphic identified by shifting each of the first sides of the first graphic by a certain length in a direction toward an inside of the first graphic and by tracing, in a certain direction, the first sides after the shifting and intersection points between the first sides after the shifting,
generating data of a third graphic by shifting each of a plurality of second sides of the second graphic to both sides of each of the second sides by the certain length and by linking end points of the second sides after the shifting using a circular arc which is centered on an end point of the second side before the shifting and which has a radius of the certain length,
generating data of a fourth graphic, using a computer, by performing a logical addition operation relating to a graphic between the second graphic and the third graphic, and
outputting the first, second, third, or fourth graphic to a display device.

6. The graphic processing method according to claim 5, further comprising:
generating data of a fifth graphic by shifting each of the first sides of the first graphic by the certain length in the direction toward the inside of the first graphic, by generating a circle which has a radius of the certain length and which is centered on the intersection point between the first sides after the shifting where an angle between the first sides before the shifting is greater than an acceptable angle and by identifying a closed region surrounded by the circle and the first sides before the shifting,
generating data of a sixth graphic by performing a logical addition operation elating to a graphic between the fourth graphic and the fifth graphic contained within the first graphic,
generating data of a seventh graphic by performing a difference operation relating to a graphic, the difference operation removing the sixth graphic from the first graphic, and
outputting the fifth, sixth, or seventh graphic to the display device.

7. The graphic processing method according to claim 5, wherein
the data of the first graphic includes data of corners of an external form in order of tracing the external form in a first direction and includes data of corners of a punching in order of tracing the punching in a second direction opposite to the first direction, and
the generating the data of the second graphic includes
generating the data of the second graphic identified by tracing, in the first direction, the first sides after shifting and the intersection points between the first sides after the shifting where the first sides before the shifting and the intersection points between the first sides before the shifting are contained in the external form.

8. The graphic processing method according to claim 5, wherein the generating the data of the second graphic includes connecting end points of the first sides after the shifting, using a circular arc.

9. A non-transitory computer readable recording medium for storing a graphic processing program, the graphic processing program causing a computer to execute a process using a plurality of first sides of a first graphic stored in a data storage unit, the process comprising:

generating data of a second graphic identified by shifting each of the first sides of the first graphic by a certain length in a direction toward an inside of the first graphic and by tracing, in a certain direction, the first sides after the shifting and intersection points between the first sides after the shifting, generating data of a third graphic by shifting each of a plurality of second sides of the second graphic to both sides of each of the second sides by the certain length and by linking end points of the second sides after the shifting using a circular arc which is centered on an end point of the second side before the shifting and which has a radius of the certain length, generating data of a fourth graphic, using a computer, by performing a logical addition operation relating to a graphic between the second graphic and the third graphic, and outputting the first, second, third, or fourth graphic to a display device.

10. The storage medium according to claim 9, wherein the process further includes generating data of a fifth graphic by shifting each of the first sides of the first graphic by the certain length in the direction toward the inside of the first graphic, by generating a circle which has a radius of the certain length and which is centered on the intersection point between the first sides after the shifting where an angle between the first sides before the shifting is greater than an acceptable angle and by identifying a closed region surrounded by the circle and the first sides before the shifting, generating data of a sixth graphic by performing a logical addition operation elating to a graphic between the fourth graphic and the fifth graphic contained within the first graphic, generating data of a seventh graphic by performing a difference operation relating to a graphic, the difference operation removing the sixth graphic from the first graphic, and outputting the fifth, six, or seventh graphic to the display device.

11. The storage medium according to claim 9, wherein the data of the first graphic includes data of corners of an external form in order of tracing the external form in a first direction and includes data of corners of a punching in order of tracing the punching in a second direction opposite to the first direction, and the generating the data of the second graphic includes generating the data of the second graphic identified by tracing, in the first direction, the first sides after shifting and the intersection points between the first sides after the shifting where the first sides before the shifting and the intersection points between the first sides before the shifting are contained in the external form.

12. The storage medium according to claim 9, wherein the generating the data of the second graphic includes connecting end points of the first sides after the shifting, using a circular arc.

\* \* \* \* \*